US012783855B2

(12) United States Patent
Shiflett et al.

(10) Patent No.: US 12,783,855 B2
(45) Date of Patent: Nov. 3, 2026

(54) PHOTONIC ACCELERATOR FOR DEEP NEURAL NETWORKS

(71) Applicant: Ohio University, Athens, OH (US)

(72) Inventors: Kyle Shiflett, Chillicothe, OH (US); Avinash Karanth, Canal Winchester, OH (US)

(73) Assignee: Ohio University, Athens, OH (US)

( * ) Notice: Subject to any disclaimer, the term of this patent is extended or adjusted under 35 U.S.C. 154(b) by 623 days.

(21) Appl. No.: 18/263,173

(22) PCT Filed: Jan. 24, 2022

(86) PCT No.: PCT/US2022/013501
§ 371 (c)(1),
(2) Date: Jul. 27, 2023

(87) PCT Pub. No.: WO2022/164746
PCT Pub. Date: Aug. 4, 2022

(65) Prior Publication Data

US 2024/0127040 A1 Apr. 18, 2024

Related U.S. Application Data

(60) Provisional application No. 63/144,198, filed on Feb. 1, 2021.

(51) Int. Cl.
*G06N 3/0464* (2023.01)

(52) U.S. Cl.
CPC .................................. *G06N 3/0464* (2023.01)

(58) Field of Classification Search
CPC .... G06N 3/045; G06N 3/0464; G06N 3/0675; G02F 1/212; G02F 1/225
See application file for complete search history.

(56) References Cited

U.S. PATENT DOCUMENTS 11,460,753 B2 * 10/2022 Hughes ................ G06V 10/955
11,604,978 B2 * 3/2023 Hamerly ................ G06N 3/045
(Continued)

FOREIGN PATENT DOCUMENTS

CN 112101540 A 12/2020

OTHER PUBLICATIONS

PCT Office, International Preliminary Report on Patentability issued in PCT/US2022/013501 dated Jul. 31, 2023.
(Continued)

*Primary Examiner* — Boubacar Abdou Tchoussou
(74) *Attorney, Agent, or Firm* — Wood Herron & Evans LLP

(57) ABSTRACT

Devices and methods for performing computations for neural networks. A photonic locally-connected unit for a neural network accelerator includes a plurality of optical modulators, a positive accumulation waveguide, a negative accumulation waveguide, a plurality of optical adders, and first and second photodetectors. Each optical modulator receives a respective input optical signal and a respective electrical signal. Each optical signal is indicative of a value of input element, and each electrical signal is indicative of the value of a weight. Each optical modulator modulates the received input optical signal with the received electrical signal to generate a weighted optical signal. Each optical adder selectively couples one of the respective weighted optical signals into one of the positive or negative accumulation waveguides based on whether the respective weight is positive or negative. The first and second photodetectors generate an output current based on optical signals received from the accumulation waveguides.

12 Claims, 15 Drawing Sheets

(56) References Cited

U.S. PATENT DOCUMENTS

| | | | | |
|---|---|---|---|---|
| 2002/0176140 | A1 | 11/2002 | Davis | |
| 2017/0222729 | A1 | 8/2017 | Sadot et al. | |
| 2018/0285715 | A1 | 10/2018 | Son et al. | |
| 2019/0370652 | A1 | 12/2019 | Shen et al. | |
| 2021/0011312 | A1 | 1/2021 | Nahmias et al. | |
| 2021/0133547 | A1* | 5/2021 | Lin | G06N 3/067 |
| 2023/0316061 | A1* | 10/2023 | Aflatouni | G06N 3/048 706/15 |

OTHER PUBLICATIONS

PCT Office, Search Report and Written Opinion issued in PCT/US2022/013501 dated May 2, 2022.

* cited by examiner

PHOTONIC ACCELERATOR FOR DEEP NEURAL NETWORKS

CROSS-REFERENCE TO RELATED APPLICATIONS

This application claims the benefit of co-pending U.S. Application No. 63/144,198, filed Feb. 1, 2021 and entitled "Photonic Accelerator for Deep Neural Networks", the disclosure of which is incorporated by reference herein in its entirety.

GOVERNMENT RIGHTS

This application claims the benefit of co-pending Intl. Application No. PCT/US2022/013501 and entitled "Photonic Accelerator for Deep Neural Networks", claiming the benefit of U.S. Application No. 63/144,198, filed Feb. 1, 2021 and entitled "Photonic Accelerator for Deep Neural Networks", the disclosures of which are incorporated by reference herein in their entireties.

FIELD OF THE INVENTION

The present invention relates generally to neural networks and, more particularly, to a neural network accelerator including photonic circuits.

BACKGROUND

Dennard scaling is a scaling law which predicts that for each generation of Complementary Metal-Oxide-Semiconductor (CMOS) technology, device area and power consumption is cut in half. However, as CMOS technology has matured, it has become apparent that going forward, applications can no longer count on Dennard scaling for improved performance. To improve the throughput and energy-efficiency of deep neural networks for various applications, highly-parallel and specialized electrical hardware accelerators are now being proposed. However, the collective data movement primitives such as multicast and broadcast that are required for multiply-and-accumulate computation in deep neural network models are expensive, consume excessive energy, and have high latency. This consequently limits the scalability and performance of known hardware accelerators.

Thus, there is a need for improved devices and methods for performing computations for neural networks that provide improved performance.

SUMMARY

In an embodiment of the invention, a neural network accelerator is provided. The neural network accelerator includes a photonic locally-connected unit. The photonic locally-connected unit includes a plurality of optical modulators, a positive accumulation waveguide, a negative accumulation waveguide, a plurality of optical adders, a first photodetector, and a second photodetector. Each optical modulator receives a respective input optical signal indicative of a value of a respective input element, and a respective electrical signal indicative of the value of a respective weight. Each optical modulator modulates the respective input optical signal with the respective electrical signal to generate a respective weighted optical signal. Each of the optical adders selectively couples one of the respective weighted optical signals into one of the positive accumulation waveguide or the negative accumulation waveguide based on whether the respective weight is positive or negative. The first photodetector generates a positive current in response to receiving a first accumulated optical signal from the positive accumulation waveguide, the second photodetector generates a negative current in response to receiving a second accumulated optical signal from the negative accumulation waveguide, and the photonic locally-connected unit generates an output current that is a sum of the positive current and the negative current.

In an aspect of the invention, the respective input optical signal received at each optical modulator may be one of a first plurality of input optical signals received by the optical modulator, and each input optical signal may have a unique wavelength, be indicative of the value of one of a plurality of input elements, and be modulated by the optical modulator to generate a weighted optical signal.

In another aspect of the invention, the positive accumulation waveguide may be one of a plurality of positive accumulation waveguides, the negative accumulation waveguide may be one of a plurality of negative accumulation waveguides, the first photodetector may be one of a plurality of first photodetectors, the second photodetector may be one of a plurality of second photodetectors, and the photonic locally-connected unit may further include a plurality of weighted input waveguides. Each weighted optical signal may be operatively coupled into a respective one of the plurality of weighted input waveguides, and each weighted optical signal carried by a weighted input waveguide may be selectively coupled to one of the plurality of positive accumulation waveguides or the plurality of negative accumulation waveguides by one of the plurality of optical adders based on whether the weight applied to the weighted optical signal is positive or negative.

In another aspect of the invention, each optical adder may include a microring resonator that selectively couples one of the first plurality of input optical signals from a respective weighted input waveguide to one of a respective positive accumulation waveguide or a respective negative accumulation waveguide based on whether the weight is positive or negative.

In another aspect of the invention, each optical modulator may include a Mach-Zehnder modulator.

In another aspect of the invention, the photonic locally-connected unit may be one of a plurality of photonic locally-connected units in a photonic locally-connected group, and the neural network accelerator may further include an optical demultiplexer and a plurality of optical couplers. The optical demultiplexer may receive a composite input optical signal including a second plurality of input optical signals each having a unique wavelength and separately couple each input optical signal into one of a first plurality of optical waveguides that is partitioned into a plurality of waveguide groups each including a portion of the first plurality of optical waveguides. Each of the plurality of optical couplers may be configured to receive a respective portion of the first plurality of optical waveguides, and output a multicast pattern of the input optical signals carried by the respective portion of the first plurality of optical waveguides into a second plurality of optical waveguides such that each optical waveguide of the second plurality of optical waveguides carries the first plurality of input optical signals.

In another aspect of the invention, the photonic locally-connected group may be one of a plurality of photonic locally-connected groups, and the neural network accelerator may further include an optical signal generator that generates the composite input optical signal, and a plurality of Y-branches that broadcast the composite input optical signal to each of the plurality of photonic locally connected groups.

In another aspect of the invention, each photonic locally-connected group may operate on a single kernel, and a plurality of kernels may be applied in a convolutional neural network layer.

In another embodiment of the invention, a method of accelerating a neural network is provided. The method includes receiving the respective input optical signal indicative of the value of the respective input element and the respective electrical signal indicative of the value of the respective weight at each of the plurality of optical modulators, modulating the respective input optical signal with the respective electrical signal to generate the respective weighted optical signal, selectively coupling one of the respective weighted optical signals into one of the positive accumulation waveguide or the negative accumulation waveguide based on whether the respective weight is positive or negative, generating the positive current based on the first accumulated optical signal from the positive accumulation waveguide, generating the negative current based on the second accumulated optical signal from the negative accumulation waveguide, and generating the output current by summing the positive current and the negative current.

In another aspect of the invention, the positive accumulation waveguide may be one of the plurality of positive accumulation waveguides, the negative accumulation waveguide may be one of the plurality of negative accumulation waveguides, and the method may further include selectively coupling each weighted optical signal to one of the plurality of positive accumulation waveguides or the plurality of negative accumulation waveguides based on whether the weight applied to the weighted optical signal is positive or negative.

In another aspect of the invention, each weighted optical signal may be selectively coupled to the one of the plurality of positive accumulation waveguides or the plurality of negative accumulation waveguides by a microring resonator based on whether the weight is positive or negative.

In another aspect of the invention, the method may further include receiving the composite input optical signal including the second plurality of input optical signals each having a unique wavelength, separately coupling each input optical signal into one of the first plurality of optical waveguides that is partitioned into the plurality of waveguide groups each including the portion of the first plurality of optical waveguides, receiving the respective portion of the first plurality of optical waveguides at each of the plurality of optical couplers, and outputting the multicast pattern of the input optical signals carried by the respective portion of the first plurality of optical waveguides into the second plurality of optical waveguides such that each optical waveguide of the second plurality of optical waveguides carries the first plurality of input optical signals.

In another aspect of the invention, the method may further include generating the composite input optical signal by the optical signal generator, and broadcasting the composite input optical signal to each of the plurality of photonic locally connected groups.

In another aspect of the invention, the method may further include operating each photonic locally-connected group on a single kernel, and applying the plurality of kernels in the convolutional neural network layer.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
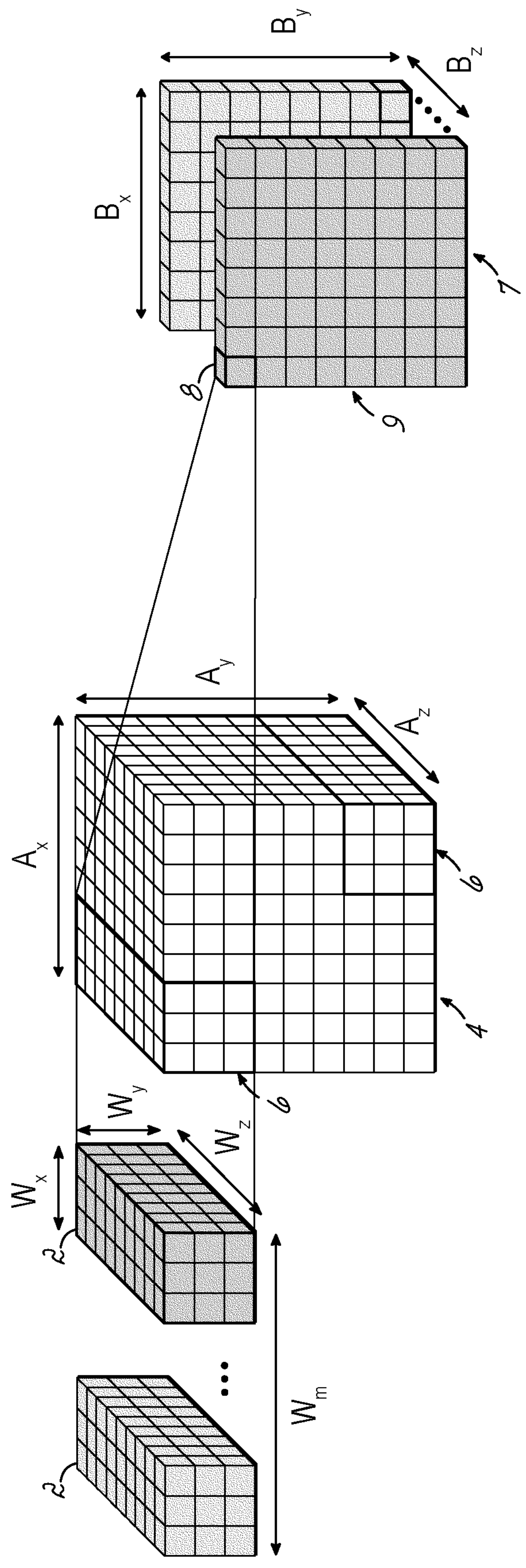
FIG. 1 is a diagrammatic view of an exemplary convolution operation between a plurality of kernels and an input volume.

Embodiments of the invention include neural network accelerators having a photonic architecture for scaling deep neural network acceleration. The neural network accelerators include photonic devices and circuits that provide efficient implementation of multicast and broadcast operations which exploit parallelism within deep neural network models. Unique features of photonics such as low energy consumption, high channel capacity with wavelength-division multiplexing, and high speed may enable scaling for deep neural network acceleration beyond that possible with electronic circuits. Photonic devices such as microring resonators and Mach-Zehnder modulators are characterized using photonic simulators to develop device models for system level acceleration. Using the device models, parameter sharing through unique wavelength-division multiplexing dot product processing may be leveraged to develop efficient broadcast and multicast data distribution. The energy and throughput performance of embodiments of the invention are evaluated on deep neural network models such as ResNet18 (see *Deep Residual Learning for Image Recognition*, K. He et al., 2016 IEEE Conference on Computer Vision and Pattern Recognition (CVPR), 2016, pp. 770-778), MobileNet (see *MobileNets: Efficient Convolutional Neural Networks for Mobile Vision Applications*, A. G. Howard et al. 2017) and VGG16 (see *Very Deep Convolutional Networks for Large-Scale Image Recognition*, K. Simonyan et al., 2014).

Compared to known state-of-the-art electronic accelerators, the photonic accelerators disclosed herein may increase throughput by 110 times, and improve energy-delay product by an average of 74 times using currently available photonic devices. Further photonic scaling may enable the energy delay product to be reduced by at least 229 times. Characterizing photonic devices such as microring resonators and Mach-Zehnder modulators using photonic simulators quantifies the limitations imposed by these optical devices, and enables the performance of embodiments of the photonic accelerator to be estimated. The disclosed photonic computation schemes naturally exploit the shared parameters and multicast data distribution found in convolutional neural networks, thereby reducing energy consumption and increasing throughput as compared to convolutional neural network accelerators. The disclosed photonic architecture implements an efficient broadcast and multicast data distribution, and leverages parameter sharing through unique wavelength-division multiplexing dot product processing in photonic locally-connected units (PLCUs).

Microring resonator and Mach-Zehnder modulator device configurations have been modeled and simulated using a Lumerical INTERCONNECT Photonic Integrated Circuit Simulator, which is available from Ansys Canada Ltd. of Vancouver, BC, Canada. These models have been used to evaluate crosstalk and noise margins for exemplary optical subsystems of a hardware accelerator, which determines the precision levels that can be achieved for computation. Advantageously, the use of Mach-Zehnder modulators for multi-wavelength multiplication and star couplers for multicasting improves convolution energy efficiency and reduces latency of the accelerator as compared to accelerators lacking these features.

FIG. 1 depicts a convolution operation between two kernels 2 and an input volume 4 including one or more receptive fields 6. The convolution layer performs the convolution operation, which is a series of dot products between the kernels 2 and the receptive fields 6 of input volume 4. The input volume 4 may be defined by a three-dimensional data structure having a width $A_x$, height $A_y$, and depth $A_z$. Each receptive field 6 may define a region of the input volume 4 where the kernels 2 are applied. Each two-dimensional width-height slice of the input volume 4 may comprise a plurality of input elements $A_{ij}$ that define a channel in the input volume 4 such that the number of channels is equivalent to $A_z$. Each dot product between a kernel 2 and a receptive field 6 in the input volume 4 produces an activation 8 in an output volume 7, and the application of a kernel over the entire input volume may produce a two-dimension feature map 9. Each element of each kernel 2 may be referred to individually as a weight $W_i$. The depth $B_z$ of the output volume 7 is equal to the number of feature maps 9, which is equal to the number of kernels $W_m$. The kernels 2 may be applied with a stride S, which is the number of elements that the kernel is moved in a single dimension from one dot product to the next. For a system having square inputs and receptive fields (i.e., dimension x=y), the dimensions of the feature map 9 may be:

$$B_x = B_y = \left[\frac{A_x - W_x + 2P_x}{S_x}\right] + 1 \qquad \text{Eqn. 1}$$

where P is the zero padding of the input volume. The shape of the output volume 7 is thus $B_x \times B_y \times W_m$.

Table I provides an algorithm that defines the convolution operation which occurs in a single layer of a neural network. The square brackets in the algorithm index elements along a dimension. The dimensionality is as follows: A[z][y][x], W[m][z][y][x], and B[z][y][x]. The indexing operator ":" is used such that [:] means all indices along that dimension, and [x : y] means indices x to y−1. The function f may be a nonlinear activation function, such as the rectified linear activation function. Photonic circuits may be used to perform multiplication and addition and compute optical dot products. These photonic circuits may include precision limitations due to optical crosstalk and noise, which may be a consideration for the photonic circuit architectures.

TABLE I

Convolution Operation for a Single Input Volume

```
function CONV (A, W)
  for m ← 0; step 1; while m < W_m do
    y_B ← 0
    for y_A ← 0; step S; while y_A < A_y do
      x_B ← 0
      for x_A ← 0; step S; while x_A < A_x do
        a ← A[:][y_A : y_A + W_y] [x_A : W_x]
        w ← W[m][:][:][:]
        B[m][y_B][x_B] ← f(a · w)
        x_B ← x_B + 1
      end for
      y_B ← y_B + 1
    end for
  end for
end function
```

Optical multiplication may be performed by scaling the optical power of an optical signal, e.g., by attenuating the signal if the multiplier is less than unity. Scaling an optical signal by a multiplier greater than unity may require the introduction of supplementary optical power to from additional laser sources. Thus, to minimize laser power consumption, optical signals may be multiplied by values (kernel weights $W_i$) in the interval [0, 1], thereby keeping the output optical power $P_{out}$ of the photonic multiplier in the range $0 \le P_{out} \le P_{in}$.

Figure 2:
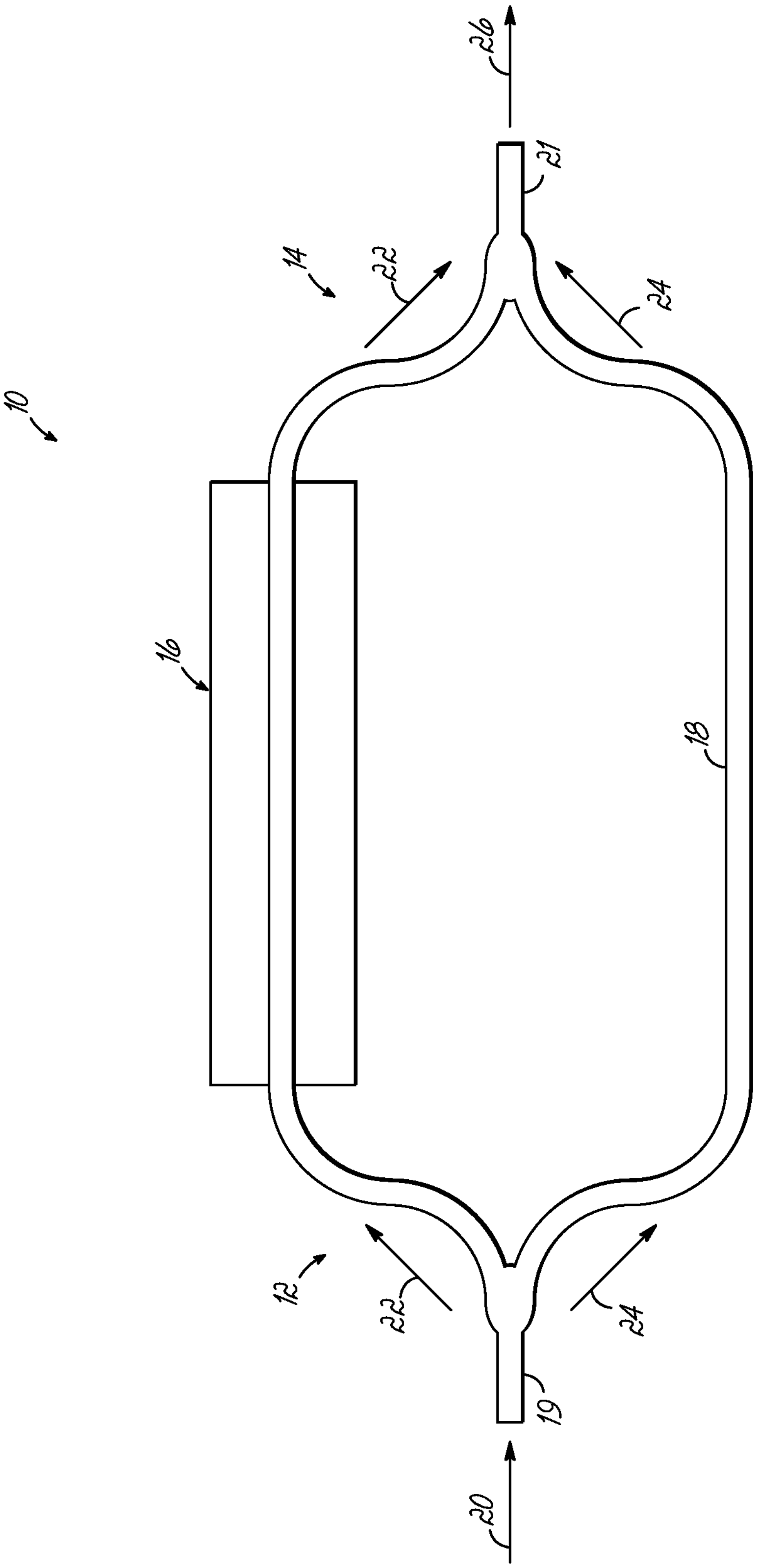
FIG. 2 is a diagrammatic view of an exemplary optical modulator.

Referring now to FIG. 2, optical multiplication may be performed using an optical modulator 10, such the depicted Mach-Zehnder modulator. The exemplary optical modulator 10 includes an input optical splitter 12 operatively coupled an output optical combiner 14 by upper and lower optical elements 16, 18. The input optical splitter 12 may provide an optical input 19 for the optical modulator 10, and the output optical combiner 14 may provide an optical output 21 for the optical modulator 10. At least one of the optical elements 16, 18 (e.g., optical element 16) may include a phase shifter having a controllable phase shift $\varphi_{PS}$. The phase shift $\varphi_{PS}$ may be controlled, for example, by applying an electric signal to a material having a refractive index that is a function of the strength of an electric field. The resulting change in the effective index of refraction of the optical element may result in the phase shift $\varphi_{PS}$. The other optical element 16, 18 (e.g., optical element 18) may comprise a transmission line having a fixed phase shift $\varphi_{TL}$. An input optical signal 20 having a power $P_{in}$ entering the optical splitter 12 may be split into upper and lower optical signals 22, 24 each having a respective power $P_{in}/(s)$, $P_{in}/(1-s)$, where s has a value of between 0 and 1. The upper and lower optical signals 22, 24 may be recombined by the optical combiner 14 to produce an output optical signal 26 having a power $P_{out}$ that depends at least in part on the amount of phase shift applied to one or the other of the optical signals 22, 24.

The optical modulator 10 can multiply an optical signal through destructive interference. This may be achieved, for example, by selectively shifting the phase of the optical beam in one arm of the device, e.g., the upper optical element 16. This may produce a differential phase shift $\Delta\varphi = (\varphi_{PS} - \varphi_{TL})$ between the upper and lower optical signals 22, 24. The phase shifter may include a doped junction that experiences a change in refractive index in response to an applied voltage. This change in refractive index may cause a phase shift, e.g., due to a plasma dispersion effect. The output power $P_{out}$ of the optical modulator 10 may then be defined by:

$$P_{out} = \frac{P_{in}}{s} + \frac{P_{in}}{(1-s)} L \Delta\varphi \quad \text{Eqn. 2}$$

where $0 < \Delta\varphi < \pi$. By way of example, for an even power split (s=0.5) of the input optical signal 20, a phase shift of $\Delta\varphi = \pi$ may cause the phase shifted optical signals to add destructively such that $P_{out} \approx 0$, thereby providing a multiply by 0. A phase shift of $\Delta\varphi = 0$ may cause the phase shifted optical signals to add constructively such that $P_{out} \approx P_{in}$, thereby providing a multiply by 1.

Advantageously, a Mach-Zehnder modulator is wavelength independent as long as the path lengths of both arms are equal. When utilizing wavelength-division multiplexing, a Mach-Zehnder modulator can multiply several input optical signals 20 each having a different wavelength by the same kernel weight $W_i$ in parallel. Thus, using Mach-Zehnder modulators for the optical modulator 10 may enable wavelength-division multiplexing so long as the different wavelengths do not interfere with each other.

Figure 3:
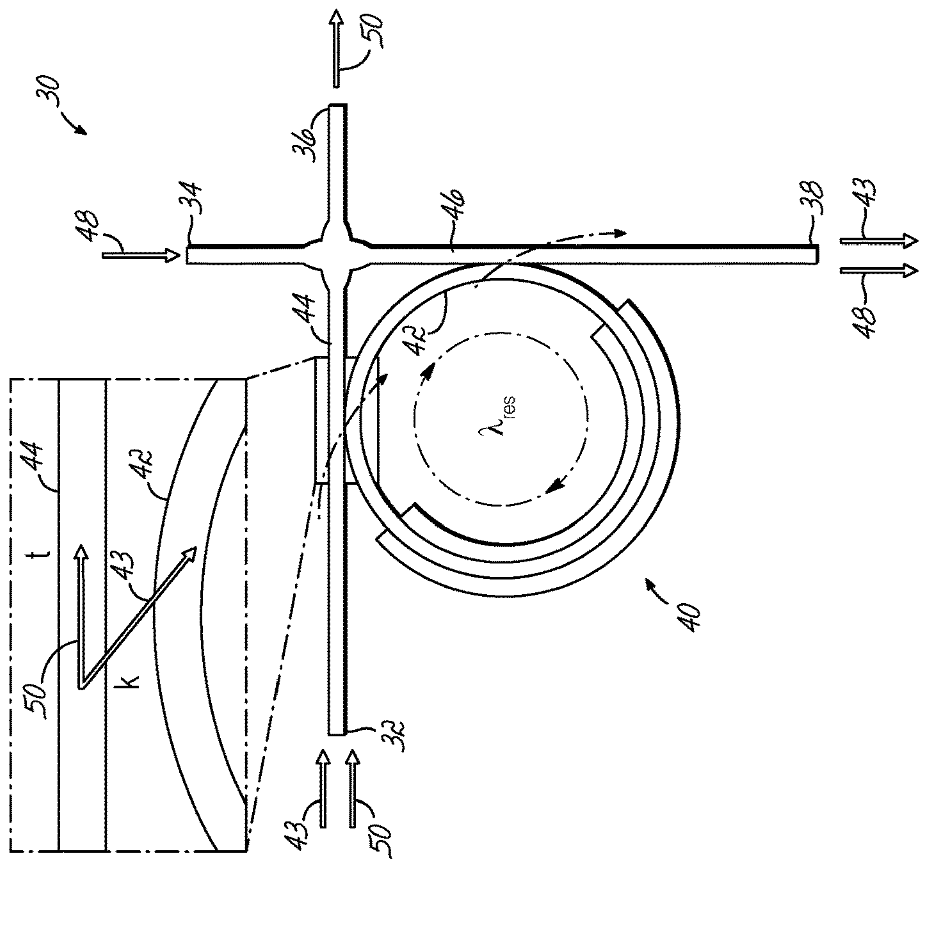
FIG. 3 is a diagrammatic view of an exemplary optical adder.

FIG. 3 depicts an exemplary optical adder 30 that includes an input port 32, an add port 34, a through port 36, a drop port 38, and microring resonator 40. The optical adder 30 may perform addition by combining multiple optical signals into a single waveguide such that their combined optical power is the sum of their individual powers. The microring resonator 40 may comprise a closed-loop waveguide, or ring 42, proximate to a weighted input waveguide 44 and accumulation waveguide 46. The microring resonator 40 may be used as a wavelength filter that performs addition by demultiplexing selective wavelengths out of the weighted input waveguide 44 and multiplexing them into the accumulation waveguide 46. For example, an optical signal 43 at a resonant wavelength $\lambda_{res}$ of the microring resonator 40 may be coupled from the weighted input waveguide 44 into the microring resonator 40, and from the microring resonator 40 into the accumulation waveguide 46. Optical signals coupled into the accumulation waveguide 44 may thereby be added to an optical signal 48 entering the add port 34. In contrast, an optical signal 50 having a non-resonant wavelength $\lambda$ may continue propagating along the weighted input waveguide 44 unimpeded by the microring resonator 40 and out the through port 36.

The resonant wavelength $\lambda_{res}$ may be a function of the effective refractive index $n_{eff}$ of the waveguide, the circumference L of the ring 42, and the whole number of wavelengths m that fit within the ring 42, as shown below:

$$\lambda_{res} = \frac{n_{eff} L}{m}, \; m \in \mathbb{Z}^+ \quad \text{Eqn. 3}$$

Microring resonators can also modulate signals through the plasma dispersion effect, since $\Delta\lambda_{res} \propto \Delta n_{eff}$. Thus, the microring resonator 40 may be "turned off" by applying a voltage that causes the resonant wavelength $\lambda_{res}$ of the ring 42 to shift out of resonance with the input optical signal(s) 48, 50 so that the input optical signal(s) 48, 50 pass by the ring 42 without being coupled into the ring 42.

Figure 4:
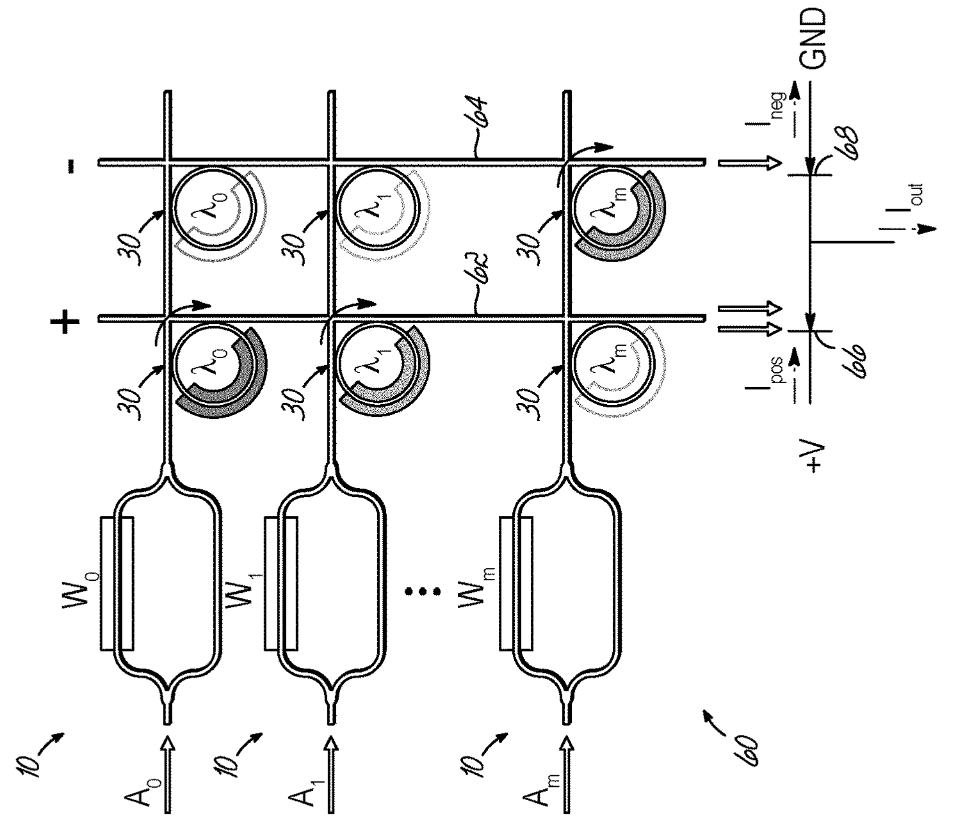
FIG. 4 is a diagrammatic view of an exemplary photonic circuit that includes the optical modulator of FIG. 2 and the optical adder of FIG. 3.

The optical dot product and the fundamental multiply-and-accumulate operations constitute the convolution operation. These functions may be implemented photonically by using optical modulators 10 for multiplication and optical adders 30 for accumulation. FIG. 4 depicts an exemplary photonic circuit 60 that may be used to compute the optical dot product between an optical input vector A and a weight vector W, where each input signal is carried on a unique wavelength. The photonic circuit 60 includes a plurality of optical modulators 10, a plurality of optical adders 30, a positive accumulation waveguide 62, a negative accumulation waveguide 64, a positive photodetector 66, and a negative photodetector 68. Each photodetector 66, 68 may comprise a photodiode, photoresistor, or other suitable device that generates or conducts electricity in response to receiving light.

Each optical modulator 10 multiplies a respective input optical signal $A_i$ by a respective weight $W_i$, and the resulting weighted optical signals are combined on one of the positive or negative accumulation waveguides 62, 64, which sum positive and negative signals respectively. The optical modulators 10 modulate the input optical signals $A_i$ depending on the applied weight $W_i$, regardless of whether the applied weight $W_i$ is positive or negative. The positive and negative photodetectors 66, 68 may receive the weighted optical signals summed by the respective positive and negative waveguides 62, 64, and convert the incident optical power into a respective electric current $I_{pos}$, $I_{neg}$ proportional to the incident optical power. The balanced photodetector arrangement shown in FIG. 4 thereby produces the positive current $I_{pos}$ from the weighted optical signals summed by the positive waveguide 62, and produces a negative current $I_{neg}$ from the weighted optical signals summed by the negative waveguide 64. The negative current $I_{neg}$ is then subtracted from the positive current $I_{pos}$ to produce an output current $I_{out}$ equal to the difference between the positive and negative currents $I_{pos}-I_{neg}$ as shown. The resulting output current is thus given by:

$$I_{out} = R_0 \sum_i P_i^+ - R_1 \sum_j P_j^- \qquad \text{Eqn. 4}$$

where $R_0$ and $R_1$ are the responsivity (in units of A/W) of the positive and negative photodetectors 66, 68, respectively, $$P_i^+$$

is the optical power of each respective positively-weighted optical signal, and $$P_i^-$$

is the optical power of each respective negatively-weighted optical signal. For the purposes of clarity and simplicity, the responsivities of the photodetectors 66, 68 may be presumed to be equal (i.e., $R_0=R_1$) in the photonic circuits described herein.

Noise may limit the precision of the photonic dot product circuit 60, and may be introduced into the photonic computation from multiple sources. One noise source is known as relative intensity noise. Relative intensity noise refers to normalized optical power fluctuations from the laser sources, and is described by a power spectral density in units of decibels per hertz relative to the carrier per hertz (dBc/Hz). Relative intensity noise may introduce noise into the current output of the photodetectors 66, 68. Another noise source is known as shot noise, and is produce by shot current. Shot noise is a discrete event and follows a Poisson probability distribution. For high event rates, shot noise may be approximated by a normal distribution. The shot current is provided by:

$$I_{shot} = \mathcal{N}(0, 2q_e I_{PD} \Delta f) \qquad \text{Eqn. 5}$$

where $q_e$ is the elementary charge, $I_{PD}$ is the current of the photodetector, and $\Delta f$ is the bandwidth. Yet another noise source is known as Johnson-Nyquist or "thermal" noise, and is provided by:

$$I_{therm} = \mathcal{N}\left(0, \frac{4k_B T}{R_f} \Delta f\right) \qquad \text{Eqn. 6}$$

where $k_B$ is the Boltzmann constant, T is the temperature, and $R_f$ is the feedback resistance of the transimpedance amplifier that converts the photodetector current into a voltage.

Noise may cause variations in the accumulated signals that decrease the number of discernible amplitudes or levels. The number of discernable levels indicates the multiply-and-accumulate precision that the system can support. It has been determined that for $\Delta f$=5 GHz, T=300 K, and a relative intensity noise=−140 dBc/Hz, the relative intensity noise contributes the least to the total noise with typical photonic circuit laser powers. This means that increasing the input optical power from the lasers may increase the precision of the system. Thus, precision may be gained, for example, by increasing laser power until relative intensity noise surpasses shot and thermal noise.

Figure 5:
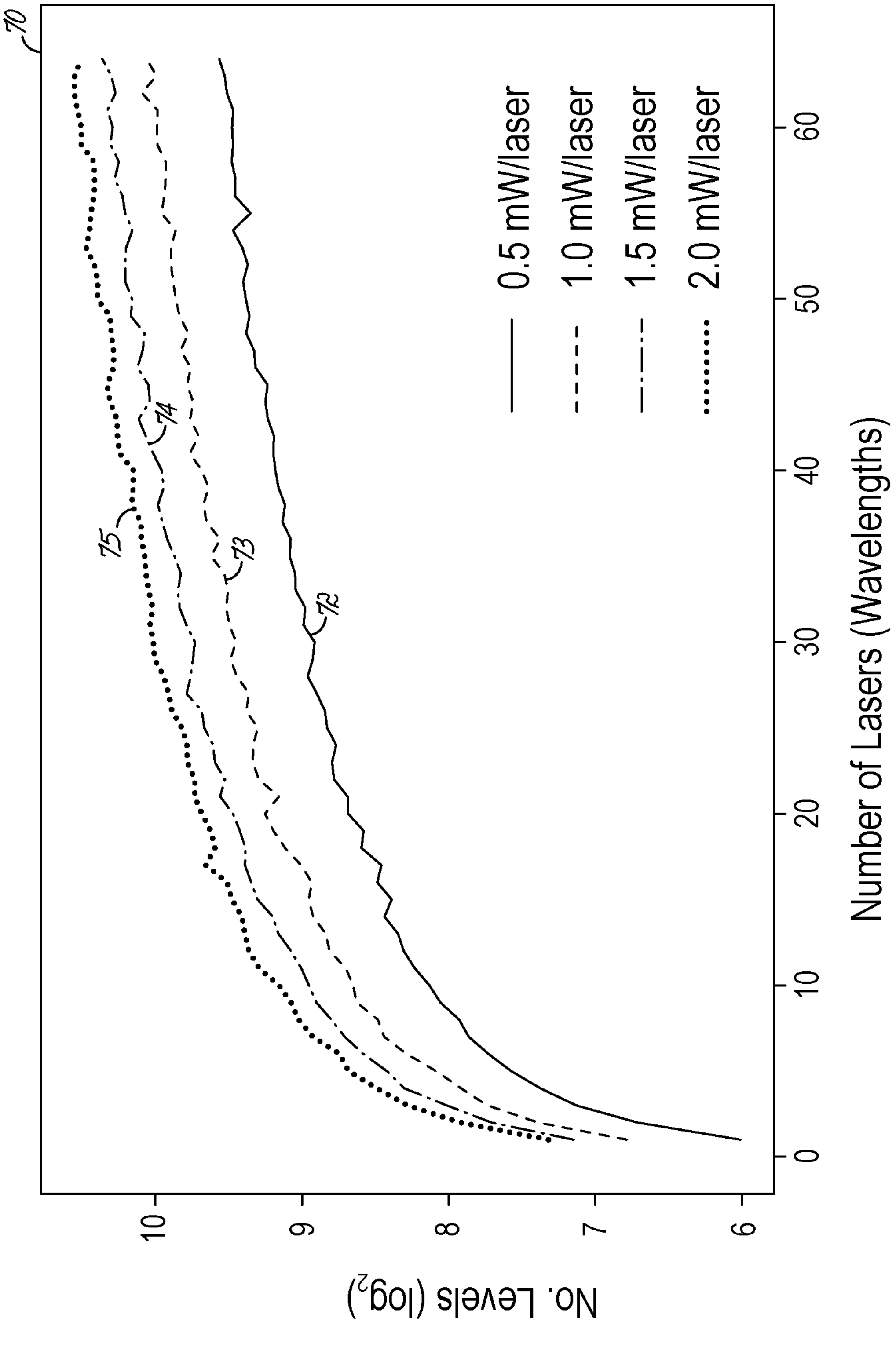
FIG. 5 is a graphical view illustrating a noise analysis for photonic dot products generated using the photonic circuit of FIG. 4.

FIG. 5 depicts a graph 70 including plots 72-75 of the number of levels versus the number of wavelengths for increasing laser power independent of crosstalk. As can be seen, there are diminishing returns for increasing laser power, with 10 bits of precision being achievable with a 2 mW optical laser source and as few as 20 wavelengths. However, as described below, crosstalk between microring resonators may alter the level of the precision that can be obtained.

A microring resonator's transmission repeats at wavelengths that fit a whole number of times in the ring, with the spacing of resonances being provided by the free spectral range (FSR) equation below:

$$FSR = \frac{\lambda_{res}^2}{n_g L} \qquad \text{Eqn. 7}$$

where $n_g$ is the group refractive index of the ring and L is the circumference of the ring. Wavelength-division multiplexing systems that use microring resonators must operate within this free spectral range, which imposes a limit on the number of wavelengths that can be accumulated by a series of microring resonators.

A wider free spectral range could reduce crosstalk between microring resonators, but decreasing the circumference L to increase the free spectral range may also increase the full width at half maximum (FWHM) of the resonance. Thus, the density of optical signals must be considered, which is indicated by:

$$\text{Finesse} = \frac{FSR}{FWHM} \qquad \text{Eqn. 8}$$

Finesse is constant regardless of L in an ideal (lossless) microring resonator. Finesse can be increased independently of L by tuning the power coupling coefficients, which can decrease the full width at half maximum without affecting the free spectral range. The full width at half maximum of a double-bus microring resonator is provided by:

$$FWHM = \frac{(1 - t_1 t_2 a)\lambda_{res}^2}{\pi n_g L \sqrt{t_1 t_2 a}} \qquad \text{Eqn. 9}$$

where $t_2$ is the power transmission coefficient, and $a^2$ is the single-pass amplitude transmission in the ring. The single-pass amplitude transmission $a^2=e^{-\alpha L}$, where $\alpha$ is the loss per unit length. In an ideal microring resonator, the power transmission coefficient a would be unity, i.e., a=1, $t^2$ is related to the power cross-coupling coefficient $k^2$ by $k^2+t^2=1$. The power cross-coupling coefficient represents the fraction of optical power coupled into the ring resonator from the input port.

Figure 6:
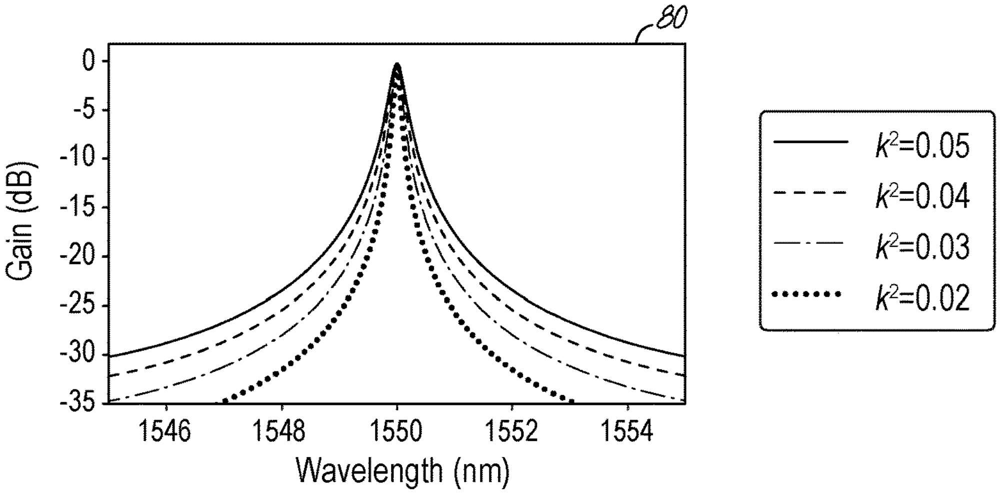
FIG. 6 is a graphical view illustrating an optical power spectrum at a drop port of the optical adder of FIG. 2.
Figure 7:
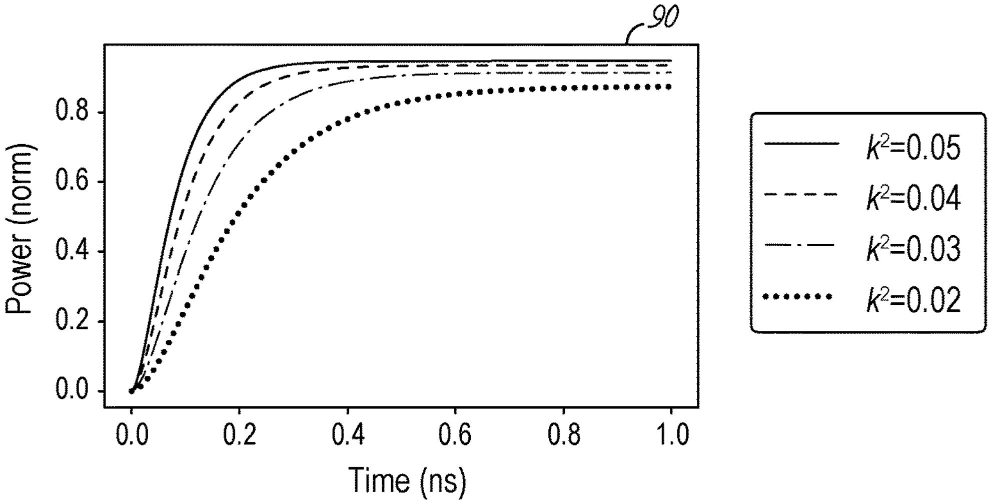
FIG. 7 is a graphical view illustrating a temporal response at the drop port of the optical adder of FIG. 2.
Figure 8:
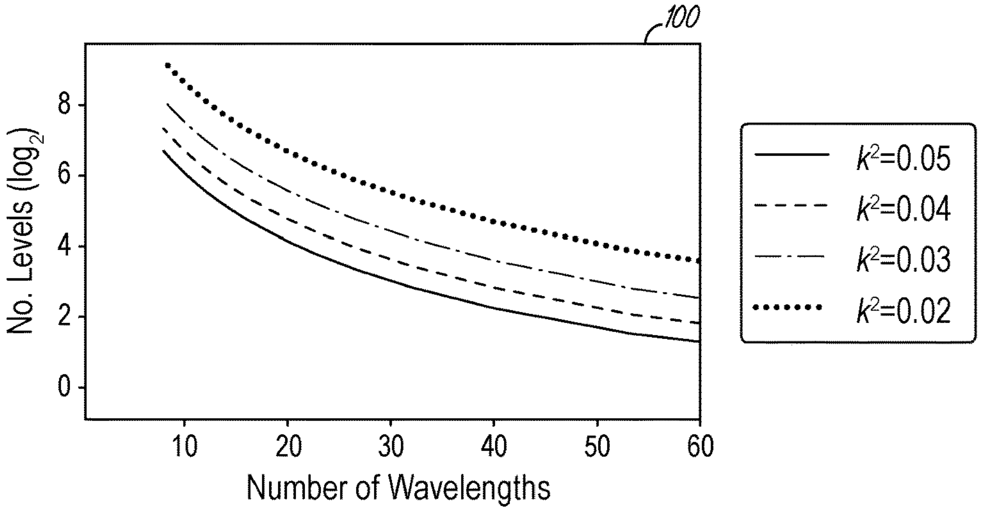
FIG. 8 is a graphical view illustrating precision verses number of wavelengths for the photonic circuit of FIG. 4.

FIG. 6 depicts a graph 80 of an exemplary optical power spectrum at the drop port of a microring resonator having a resonance wavelength $\lambda_{res}$=1550 nm for a number of different cross-coupling coefficient values. As can be seen, lowering the cross-coupling coefficient $k^2$ decreases the full width at half maximum of the microring resonator, which may reduce the amount of crosstalk from adjacent resonant wavelengths. Lowering crosstalk amplitude may increase the number of distinguishable optical amplitudes in the system. Reducing the cross-coupling coefficient $k^2$ may also increase the microring resonator's finesse, which allows for more signals to fit within the free spectral range. FIG. 7 depicts a graph 90 of a temporal response at the drop port of the microring resonator of FIG. 6 for a number of different cross-coupling coefficient values. As can be seen, the temporal response becomes longer as the value of the cross-coupling coeffect $k^2$ decreases. Thus, the optical signal may be subject considerable losses if the microring resonator modulation frequency is too high. FIG. 8 depicts a graph 100 showing precision verses number of wavelength for a microring resonator accumulator. The number of discernible optical levels defines the precision that the system can support. The vertical axis of graph 100 is a log base 2 scale to provide an indication of the bit precision possible for different numbers of wavelengths and values of the cross-correlation coeffect $k^2$.

Reduced model precision like 8-bit integer quantization is commonly used in energy-efficient architectures, and has been shown to yield competitive accuracy for computer vision tasks while improving inference time and energy consumption. As indicated by graph 100 of FIG. 8, cross-coupling coefficients of $k^2$=0.02 and $k^2$=0.03 can support 8 bits of precision for a small number of wavelengths, e.g., less than 10 wavelengths. However, as shown by graph 90 of FIG. 7, a cross-coupling coefficient of $k^2$=0.02 has a relatively poor temporal response. For around 20 wavelengths, a cross-coupling coefficient of $k^2$=0.03 can support about 6 bits of precision, but this is only for positive accumulation. With the inclusion of a negative waveguide, a photonic dot product is able to increase its bit precision by 1 bit because the addition of the negative waveguide doubles the number of values represented without increasing the number of wavelengths in the free spectral range. This means that 7 bits is the worst case precision for a cross-coupling coefficient of $k^2$=0.03 with 20 wavelengths.

The kernel weights in a neural network layer may follow a bell-shaped distribution, so there may be more crosstalk around the mean of the distribution, and less crosstalk for the tails of the distribution. A microring resonator accumulator could possibly support more optical power levels, since more important or influential features may be weighted higher (in the tails of the distribution) than others.

The multiply-and-accumulate architecture of the photonic circuit 60 depicted in FIG. 4 may be expanded horizontally to utilize the ability of a Mach-Zehnder modulator to multiply several wavelengths at once. This returns to the concept of parameter sharing in convolutional neural networks, where kernels are applied across the entire input volume 4, and several inputs are multiplied by same kernel weight $W_i$. Parameter sharing may be implemented with Mach-Zehnder modulators, which can compute on several receptive fields concurrently. An associated output element for each receptive field may be concurrently processed, which means multiple dot products can be computed in parallel. This may increase the number of wavelengths multiplied by each optical modulator, but also requires an increase in the number of microring resonators needed to accumulate each output. Introducing more wavelengths and receptive fields into a photonic dot product processor may expand the ring resonators into a crossbar-like grid with a balanced photodetector output for each receptive field being simultaneously processed.

Figure 9A:
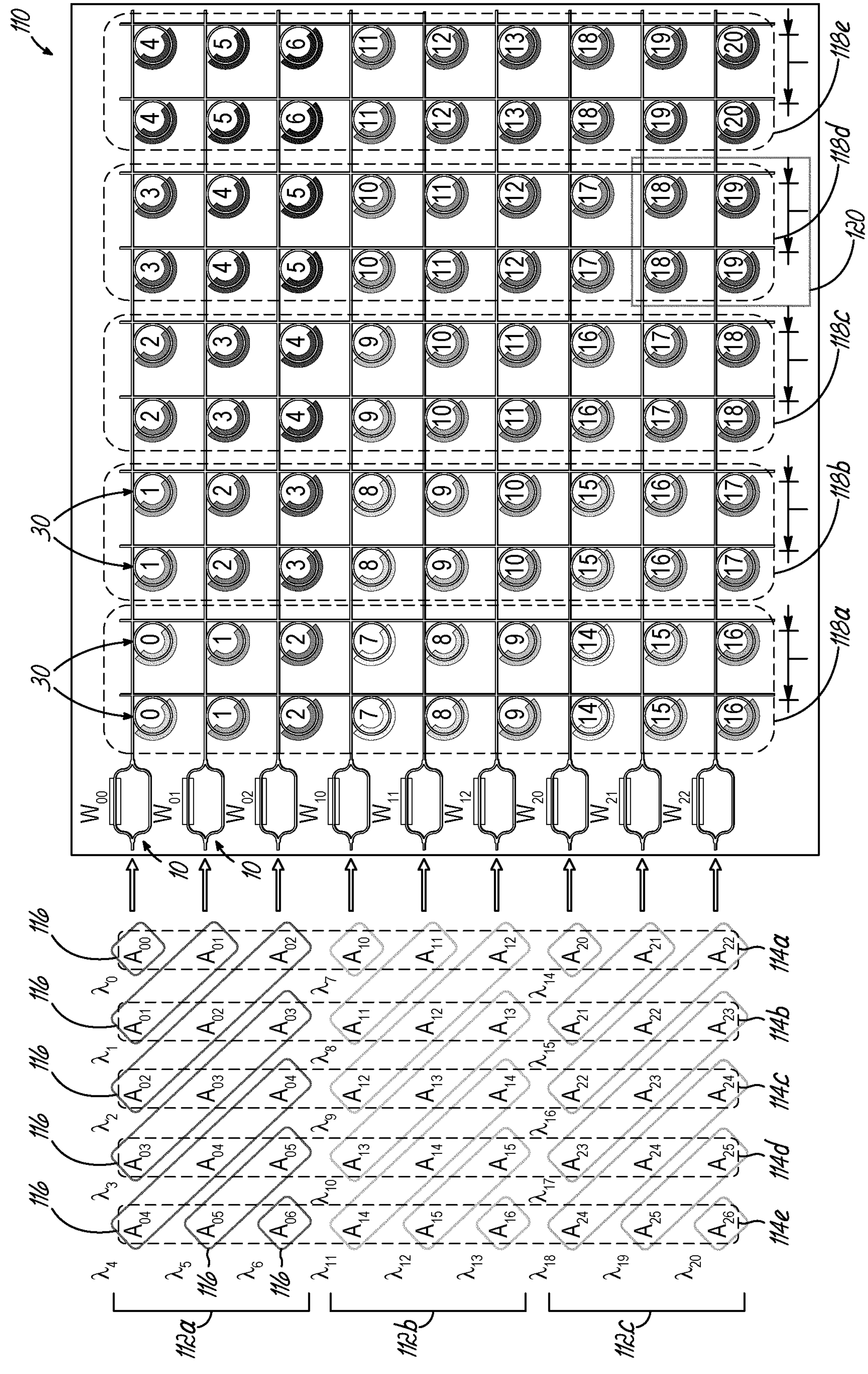
FIG. 9A is a diagrammatic view of an exemplary photonic locally-connected unit based on the photonic circuit of FIG. 4 with $N_m$=9 and $N_d$=5.
Figure 9B:
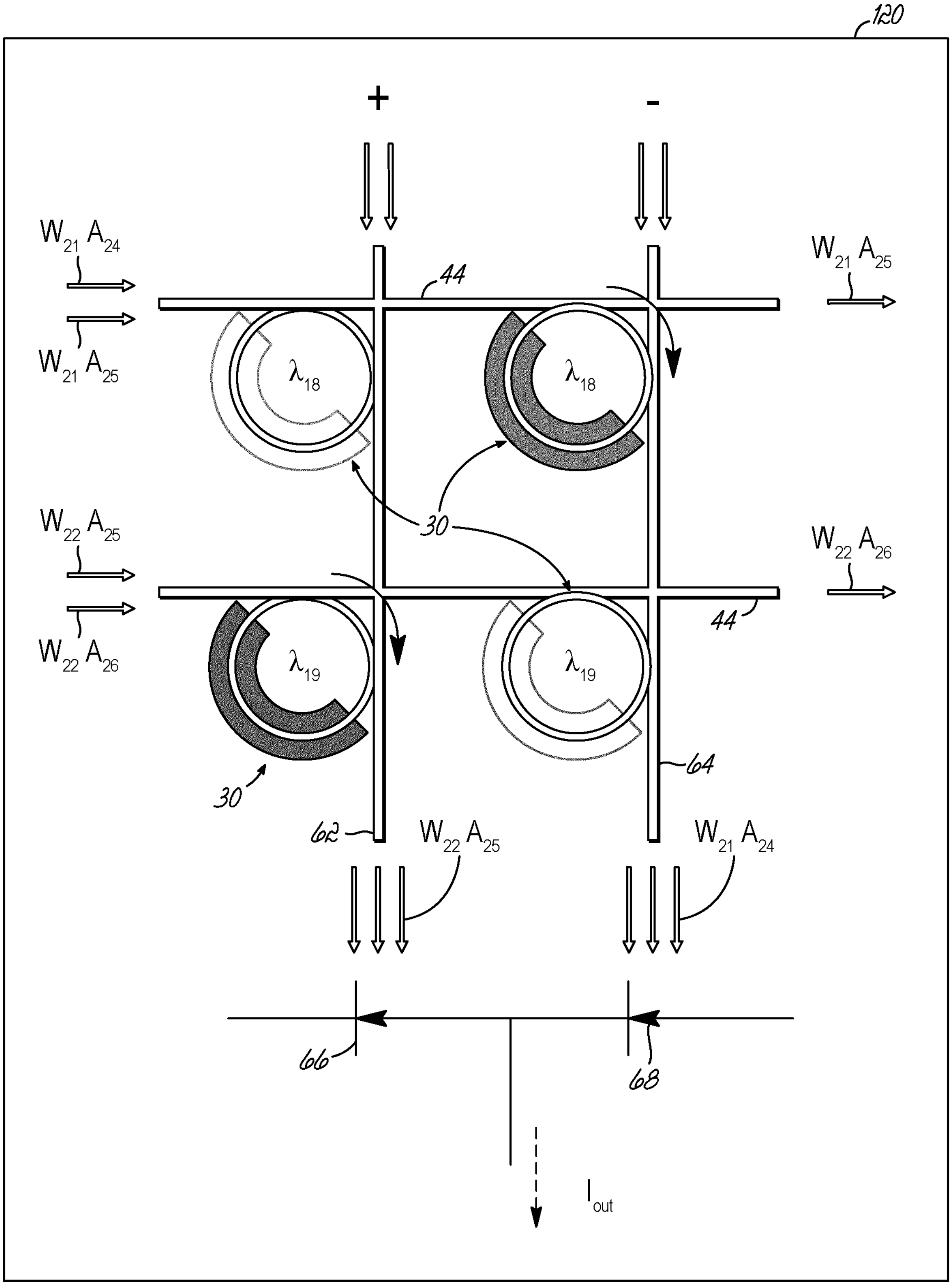
FIG. 9B is a diagrammatic view showing additional details of a portion of the photonic locally-connected unit of FIG. 9A.

FIGS. 9A and 9B depict an exemplary photonic locally-connected unit 110 having a shape $N_m \times N_d$, where $N_m$ is the number input waveguides, and $N_d$ is the number of balanced photodetector outputs. The photonic locally-connected unit 110 includes an array of $N_m$ optical modulators 10, and $2\times Nm\times N_d$ optical adders 30 arranged in a grid. The depicted photonic locally-connected unit 110 includes $N_m$=9 input waveguides, which would accommodate convolutional neural network kernels having dimensions of 3×3 and allow the photonic locally-connected unit 110 to hold an entire channel of the kernel's weights in the optical modulators 10. Kernel shapes other than $W_x \times W_y = N_m$ may still be compatible with the depicted architecture. However, a kernel with $W_x \times W_y > N_m$ may not completely fit in the photonic locally-connected unit's optical modulators 10, and may therefore require additional cycles to complete the dot product. In any case, it should be understood that the embodiments of the invention are not limited to a particular number of input waveguides $N_m$ or photodetector outputs $N_d$.

The number of wavelengths may be increased to increase the amount of parallel computation that can take place in each photonic locally-connected unit 110. However, increasing the number of wavelengths may also increase crosstalk and lead to a reduction in precision. The number of wavelengths in the photonic locally-connected unit 110 may be $\lambda = W_y(N_d + W_x - 1)$, assuming a square kernel and $W_x \times W_y = N_m$. For a design requirement of at least 7 bits of precision with reasonable temporal performance, a cross-coupling coefficient of $k^2$=0.03 may be achievable at around 20 wavelengths as described above with respect to FIGS. 6-8. The exemplary photonic locally-connected unit 110 is depicted with $N_d$=5, which yields 21 total wavelengths for $N_m$=9.

Each photonic locally-connected unit 110 may process a single channel of the convolution, and compute $N_d$ concurrent receptive fields. The inputs for a single cycle computation with a stride S=1 are shown in FIG. 9A. Each group of three composite input optical signals 112*a*-112*c* represents a different row in the input volume, with each composite input optical signal including a number of input optical signals (e.g., five signals) each having a different wavelength. Overlapping receptive fields 114*a*-114*e* in each row produced by multicast groupings 116 each of the same receptive field $A_{ij}$ may produce a multicast pattern since multiple input elements are subject to the same kernel weights. These inputs may correspond to an input field with shape $W_y(N_d + W_x - 1)$, where $A_{ij}$ indicates the input element at row i and column j, and $W_{ij}$ is the kernel weight at row i and column j for the same channel. Each 3×3 receptive field 114*a*-114*e* may correspond to a respective accumulator column 118*a*-118*e*.

FIG. 9B details the filtering and switching of the optical adders 30 for a selected portion 120 of the photonic locally-connected unit 110. The weighted optical signals propagating through the upper weighted input waveguide 44 of portion 120 include weighted optical signals $W_{21}A_{24}$, $W_{21}A_{25}$, and the weighted optical signals propagating through the lower weighted input waveguide 44 of portion 120 include weighted optical signals $W_{22}A_{25}$, $W_{22}A_{26}$. Weighted optical signal $W_{21}A_{24}$ has a wavelength $\lambda_{18}$ and weighted optical signal $W_{21}A_{25}$ has a wavelength $\lambda_{19}$. Each of these weighed optical signals was generated by multiplying input optical signals $A_{24}$ and $A_{25}$ by weight $W_{21}$ in the optical modulator 10 of that row. Weighted optical signal $W_{22}A_{25}$ has a wavelength $\lambda_{19}$ and weighted optical signal $W_{22}A_{26}$ has a wavelength $\lambda_{20}$, and each of these weighted optical signals was generated by multiplying the input optical signals $A_{25}$ and $A_{26}$ by weight $W_{22}$ in the optical modulator 10 of that row.

Because the selected portion 120 of the photonic locally-connected unit 110 is located in the second to last accumulator column 118*d*, the upper weighted input waveguide 44 only includes remaining weighted optical signals $W_{21}A_{24}$ at $\lambda_{18}$ and $W_{21}A_{25}$ at $\lambda_{19}$, and the lower weighted input waveguide 44 only includes remaining weighted optical signals $W_{22}A_{25}$ at $\lambda_{19}$ and $W_{22}A_{26}$ at $\lambda_{20}$. This is because the weighted optical signals ($W_{21}A_{21}$ at $\lambda_{15}$, $W_{21}A_{22}$ at $\lambda_{16}$, $W_{21}A_{23}$ at $\lambda_{17}$) in the upper weighted input waveguide 44 and the weighted optical signals ($W_{22}A_{22}$ at $\lambda_{16}$, $W_{22}A_{23}$ at $\lambda_{17}$, $W_{22}A_{24}$ at $\lambda_{18}$) in the lower weighted input waveguide 44 have been previously coupled to one of the positive or negative accumulation waveguides 62, 64 of a respective one of the accumulator columns 118*a*-118*c* to the left of accumulator column 118*d*.

In the present example, weight $W_{21}$ is negative and weight $W_{22}$ is positive. Because $W_{21}$ is negative, the optical adder 30 in the upper left corner of portion 120 may be turned off, i.e., controlled so that the resonant wavelength $\lambda_{res} \neq \lambda_{18}$. This may allow the weighted optical signal $W_{21}A_{24}$ to continue propagating to the right along the weighted input waveguide 44. However, the optical adder 30 in the upper right corner of portion 120 is turned on (i.e., the resonant wavelength $\lambda_{res} = \lambda_{18}$) so that weighted optical signal $W_{21}A_{24}$ is coupled into the negative accumulation waveguide 64. Because the weighted input signal $W_{21}A_{25}$ is at wavelength $\lambda_{19}$, it continues propagating to the right along the weighted input waveguide 44 to the next accumulator column 118*e*. Because $W_{22}$ is positive, the optical adder 30 in the lower left corner of portion 120 is turned on (i.e., the resonant wavelength $\lambda_{res} = \lambda_{19}$) so that weighted optical signal $W_{22}A_{25}$ is coupled into the positive accumulation waveguide 62. In contrast, the optical adder 30 in the lower right corner may be turned off (i.e., the resonant wavelength $\lambda_{res} \neq \lambda_{18}$) to avoid coupling any residual of the weighted optical signal $W_{22}A_{25}$ into the positive waveguide 62.

Although a photonic locally-connected unit 110 may be constrained to a predetermined number of wavelengths (e.g., 21 wavelengths for exemplary photonic locally-connected unit 110 depicted in FIG. 9A), a larger number of wavelengths (e.g., ≥64) may be supported by on-chip networks for data distribution. This may allow the clustering of multiple photonic locally-connected units 110 into a photonic locally-connected group (PLCG) to process multiple channels of the input volume in parallel.

Figure 10:
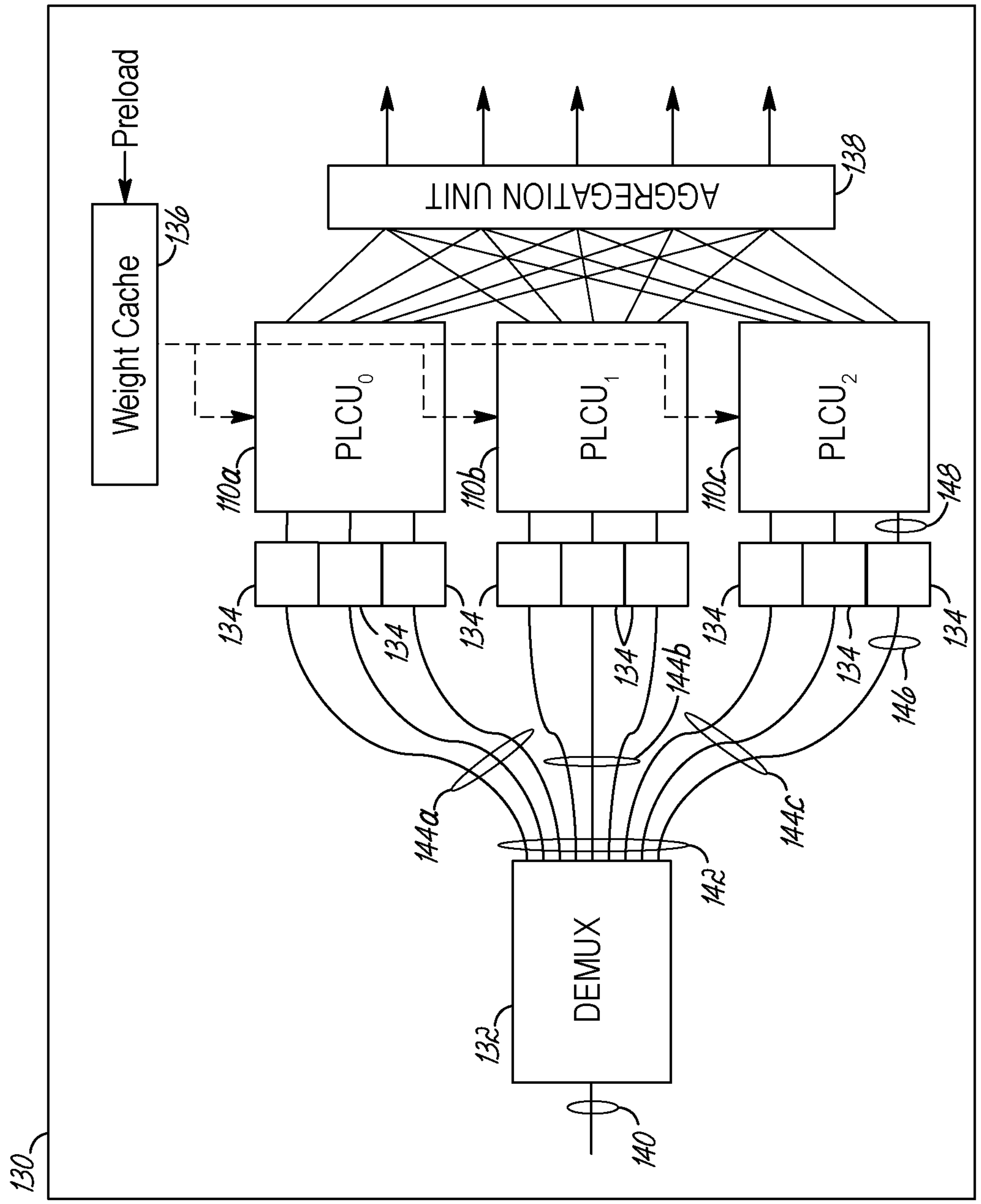
FIG. 10 is a diagrammatic view of an exemplary photonic locally-connected group including a plurality of optical couplers that distribute input optical signals to a plurality of the photonic locally-connected units of FIG. 9A, and an aggregation unit that receives output currents from the photonic locally-connected units.

FIG. 10 depicts an exemplary photonic locally-connected group 130 including a plurality of photonic locally-connected units 110*a*-110*c* (e.g., $N_u$=3 PLCUs), an optical demultiplexer 132, a plurality of optical couplers 134, a weight cache 136, and an aggregation unit 138. The optical demultiplexer 132 and optical couplers 134 may operatively couple portions of a composite input optical signal 140 to the photonic locally-connected units 110*a*-110*c*. The composite input optical signal 140 may include a plurality of input optical signals (e.g., 62 input optical signals) each having a different wavelength $\lambda_0$-$\lambda_n$, and may be provided to the optical multiplexer by a single optical waveguide (e.g., an optical fiber). The optical demultiplexer 132 may comprise an arrayed waveguide grating or other optical component that receives the composite input optical signal 140 and separately couples each wavelength $\lambda_0$-$\lambda_n$ of the composite input optical signal 140 into one of plurality of optical waveguides 142 (e.g., 62 waveguides). This plurality of optical waveguides 142 may be partitioned into a number of waveguide groups 144*a*-144*c* (e.g., three groups) each comprising a portion of the of plurality of optical waveguides 142 (e.g., 21 waveguides). Each of the waveguide groups 144*a*-144*c* may be operatively coupled to a respective photonic locally-connected unit 110*a*-110*c* through one or more of the optical couplers 134.

Figure 11:
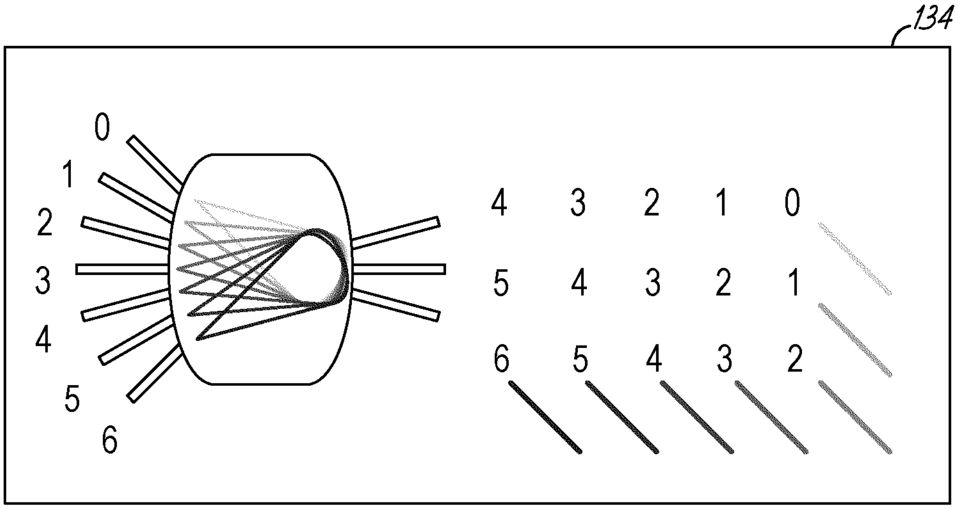
FIG. 11 is a diagrammatic view of the optical coupler of FIG. 10.

FIG. 11 depicts an exemplary optical coupler 134 comprising a star coupler configured to combine a plurality of input optical signals (e.g., 7 optical signals) received from a respective portion 146 of a waveguide group 144*a*-144*c* (e.g., 7 of 21 waveguides), and output a multicast pattern into another plurality of optical waveguides 148 (e.g., 3 optical waveguides). In an embodiment of the invention, seven waveguides (e.g., 0-6) each carrying an optical signal having a different wavelength ($\lambda_0$-$\lambda_6$) may be coupled into three output waveguides each carrying five optical signals. Each of the five optical signals may have one of the wavelengths of the seven input optical signals, and each group of five optical signals may include one or more wavelengths that are not in the other groups, e.g., ($\lambda_0$-$\lambda_4$), ($\lambda_1$-$\lambda_5$), ($\lambda_2$-$\lambda_7$). Each star coupler may include a free propagation region that mixes several inputs. Each optical coupler 134 may receive $N_d + W_x - 1$ waveguides, each with a demultiplexed wavelength, and multiplex the signals into $W_x$ output waveguides that are fed to a set of Mach-Zehnder modulators in the photonic locally-connected unit. All input wavelengths may be delivered to a photonic locally-connected group through a single waveguide. The input wavelengths may then be demultiplexed into their own waveguides by an arrayed waveguide grating. Arrayed waveguide gratings and star couplers are passive devices, and therefore do not consume any power.

Each optical waveguide of the plurality of optical waveguides 148 may be operatively coupled to the input of a respective optical modulator 10 of a respective photonic locally-connected unit 110*a*-110*c*. Each photonic locally-connected unit 110*a*-110*c* may operate on a set of inputs which falls into a separate free spectral range. Thus, a photonic locally-connected group 130 having $N_u$=3 photonic locally-connected units 110*a*-110*c* and configured to support 64 wavelengths may process a total of 63 wavelengths.

A photonic locally-connected group 130 having $N_u$ photonic locally-connected units that processes $N_u$ channels in parallel may produce $N_d$ partial outputs for each cycle that need to be aggregated over $W_z/N_u$ cycles to complete the dot product. This avoids creating any partial sum write backs to memory since the entire dot product is aggregated before the kernel is moved and applied to another set of receptive fields. Because data movement consumes significantly more energy than computation, this reduction in writes to memory advantageously provides a significant reduction in power consumption as compared to circuits lacking this feature. The stationary accumulation of partials by the photonic locally-connected group 130 causes writes to memory only when the entire activation is complete. The partial sums that are created may be repetitively added and registered in the aggregation unit of the photonic locally-connected group 130.

Figure 12:
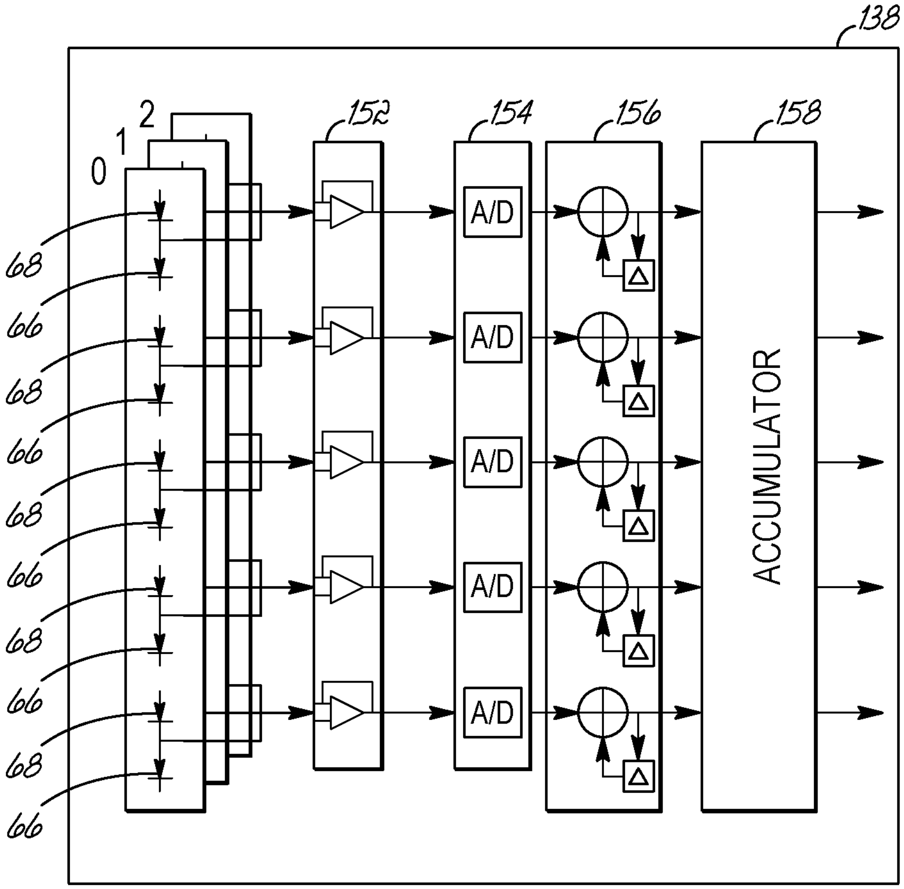
FIG. 12 is a diagrammatic view of the aggregation unit of FIG. 10.

FIG. 12 depicts an exemplary aggregation unit 138 that includes one or more transimpedance amplifiers 152, analog to digital converters 154, adders 156, and an accumulator 158. As described above with respect to FIGS. 9A and 9B, the photodetectors 66, 68 may perform optical to electrical conversion by converting optical signals into an electrical current. The differential current output by each pair of photodetectors 66, 68 may be operatively coupled to a respective transimpedance amplifier 152 that converts the received current into a voltage, and amplifies the resulting electrical signal to a suitable voltage level. This voltage may then be converted into a digital value by a respective analog-to-digital converter 154, and aggregated over a number of cycles by the adders 156 and accumulator 158. The aggregation unit 138 may include $N_d$ transimpedance amplifiers 152 and adders 156. When the dot products are complete, the rectified linear unit activation function may be applied to the digital values, and the results stored to memory.

Figure 13:
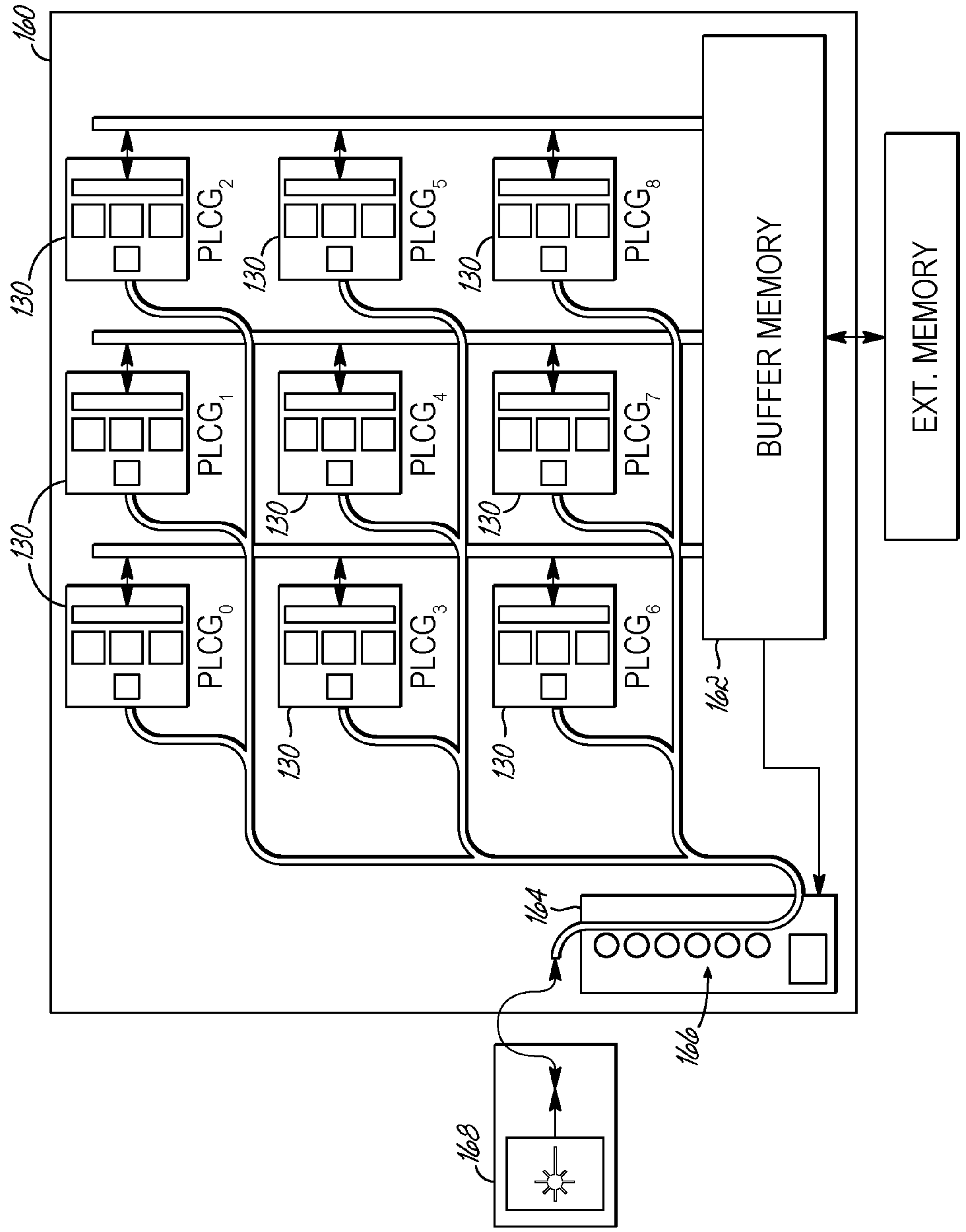
FIG. 13 is a diagrammatic view of a neural network accelerator including a plurality of the photonic locally-connected groups of FIG. 10.

FIG. 13 depicts an exemplary neural network accelerator 160 including a plurality of photonic locally-connected groups 130 (e.g., nine PLCGs), a memory 162 (e.g., static random access memory (SRAM)), and an optical signal generator 164 having a bank of microring resonators 166. Each photonic locally-connected group 130 of the neural network accelerator 160 may operate on a single kernel, and several kernels may be applied in a convolutional neural network layer. These kernels may all operate on the same input volume so that it is practical to compute multiple kernels in parallel. Computing multiple kernels in parallel may be achieved by broadcasting the same inputs to each of plurality of photonic locally-connected groups 130. Broadcasting with photonics may be performed by splitting optical signals using a series of Y-branches. The neural network accelerator 160 may incorporate the photonic locally-connected groups 130 into a single chip.

It should be understood that more or less than nine photonic locally-connected groups 130 may be implemented in a single chip. Having more locally-connected groups 130 may increase the amount of parallel processing, but may also increase area and power consumption of the chip. The value of $N_g$ may be based on the area constraints since photonic devices are large compared to digital logic. An off-chip light source 168 including one or more lasers may provide optical power to the neural network accelerator 160. The optical power provided by the light source 168 may be modulated by the bank of microring resonators 166 to generate input optical signals. These input optical signals may be broadcast to each photonic locally-connected group 130 to compute partial dot products. The memory 162 may include SRAM and provide a global buffer for storing inputs, kernel weights, and activations. The weight cache 136 of each photonic locally-connected group 130 (FIG. 10) may be configured to hold the kernel weights, which may be initially preloaded into the weight cache 136. Input values and kernel weights may undergo an electrical-to-optical conversion using digital-to-analog converters before being provided to the optical modulators 10 and the optical adders 30.

An exemplary partitioning of convolution for the exemplary neural network accelerator 160 is provided by the Algorithm of Table II. Line 2 of the Algorithm computes on $N_g$ kernels in parallel (one kernel per photonic locally-connected group). This parallel computation may be the result of photonic broadcasting of the input volume. Line 8 is the aggregation of partials over $N_u$ consecutive channels. Line 10 applies the activation function f once all partials are aggregated. Line 17 is the function that computes the $N_d$ concurrent dot products in the photonic locally-connected group, which is possible due to parameter sharing and the photonic multicasts in the star couplers.

TABLE II

Exemplary Convolution Operation

```
1:  function CONV (A, W)
2:    parallel for m ← 0; step 1; while m < W_m do ▷ N_g instances
3:      y_B ← 0
4:      for y_A ← 0; step S; while y_A < A_y do
5:        x_B ← 0
6:        for x_A ← 0; step S; while x_A < A_x do
7:          for c ← 0; step N_u; while c < W_z do
8:            B[m][y_B][x_B : x_B + N_d] ← B[m][y_B][x_B : x_B + N_d]
                + PLCGDOT(A, W, m, y_A, x_A, c)
9:          end for
10:         B[m][y_B][x_B : x_B + N_d] ← f (B[m][y_B][x_B : x_B + N_d])
11:         x_B ← x_B + N_d
12:       end for
13:       y_B ← y_B + 1
14:     end for
15:   end parallel for
16: end function
17: function PLCGDOT(A, W, m, y_A, x_A, c)
18:   parallel for i ← 0; step 1; while i < N_d do ▷ N_d instances
19:     a[i] ← A[c : c + N_u] [y_A : y_A + W_y] [x_A + i : x_A + i + W_x]
20:     w[i] ← W[m] [c : c + N_u] [:] [:]
21:     z[i] ← a[i] · w[i]
22:   end parallel for
23:   return z
24: end function
```

Figure 14:
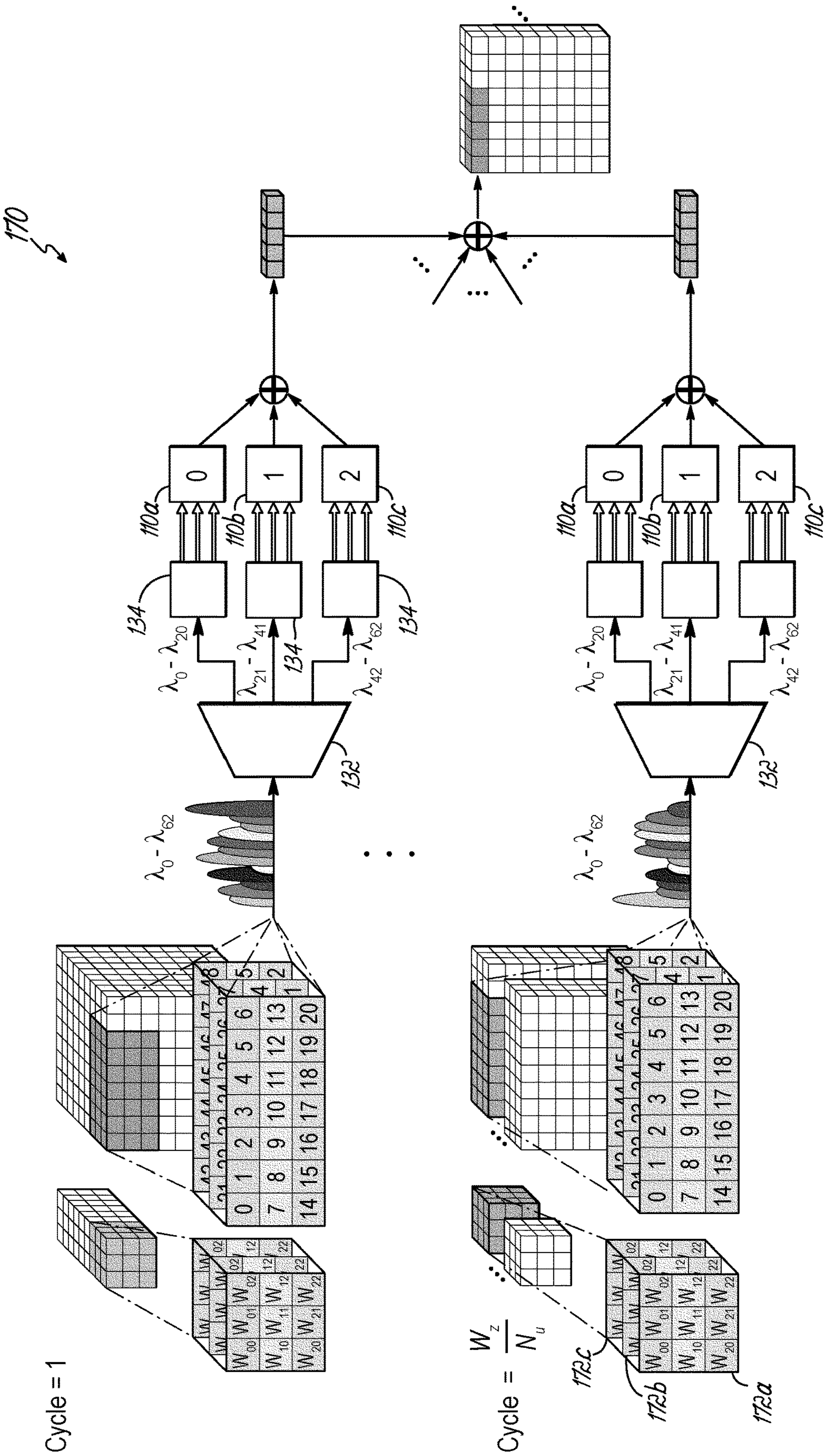
FIG. 14 is a diagrammatic view illustrating a dataflow in one of the photonic locally-connected groups of FIG. 13 with $N_u$=3, $N_m$=5, and $W_x$=$W_y$=3.

FIG. 14 depicts a dataflow 170 for a single kernel and single photonic locally-connected group for cycle=(1, 2, . . . $W_z/N_u$). In cycle=1, the first $N_u$ channels of the kernel are applied at the optical modulators 10 in the photonic locally-connected units 110*a*-110*c*, where channel zero 172*a* is applied in photonic locally-connected unit 110*a*, channel one 172*b* is applied to photonic locally-connected unit 110*b*, and channel 172*c* is applied to photonic locally-connected unit 110*c*. The $N_u \times W_y \times (N_d + W_x - 1)$ field of the input volume 4 may be modulated by the signal generation microring resonator bank 166, where each input element $A_{ij}$ is on a separate wavelength (e.g., $\lambda_0$-$\lambda_{62}$) and transmitted over a single waveguide to the photonic locally-connected group 130. Each of the wavelengths is then demultiplexed into its own waveguide by the optical demultiplexer 132 where each $(N_d + W_x - 1)$ sized row from the input volume undergoes a separate multicast at independent optical couplers 134. Once multicasting is complete, the signals then continue on to a respective photonic locally-connected unit 110*a*-110*c* to compute the $N_d$ concurrent dot products. The $N_u \times N_d$ partials created in the group are reduced to $N_d$ partials by adding the currents from corresponding photodetectors across each photonic locally-connected unit 110*a*-110*c*. The $N_d$ partials then enter the aggregation unit 138 of the photonic locally-connected group 130, where they undergo optical to electronic conversion and are registered to be added across the remainder of the $W_z/N_u$ cycles.

EXPERIMENTAL RESULTS

Three performance estimates have been made for the proposed neural network accelerator: conservative, moderate, and aggressive. The modeled circuits can be fabricated using photonic devices that have been demonstrated to date. This provides an estimate of the performance the disclosed neural network accelerators are capable of using current device fabrication technology. The moderate estimates are for devices having the performance needed to produce similar energy consumption as current state-of-the-art electronic accelerators. Since silicon photonics is an emerging technology, the moderate estimate sets a target performance. The aggressive estimates are for expected future devices that would make the disclosed photonic accelerator a high performance successor to current electronic accelerators. The aggressive estimates show metrics like energy-delay product being reduced by a factor of 100 or more. The device power parameters used for each of these estimates is shown in Table III below:

TABLE III

DEVICE POWER ESTIMATES

| Device | Conservative | Moderate | Aggressive |
|---|---|---|---|
| Microring Resonator | 3.1 mW | 388 μW | 155 μW |
| Mach-Zehnder modulator | 11.3 mW | 1.41 mW | 565 μW |
| Laser | 37.5 Mw at 20 C. | 1.38 mW | 1.88 mW |
| Transimpedance Amplifier | 3 mW | 1.5 mW | 300 μW |
| Analog to Digital Converter | 29 mW @ 5 GS/s | 14.5 mW @ 5 GS/s | 2.9 mW @ 8 GS/s |
| Digital to Analog Converter | 26 mW @ 5 GS/s | 13 mW @ 5 GS/s | 2.6 mW @ 8 GS/s |

The photonic accelerators modeled were designed and verified in Lumerical INTERCONNECT Photonic Integrated Circuit Simulator, available from Ansys Canada Ltd. of Vancouver, BC, Canada. Performance of the photonic accelerators was determined using a combination of Python and the crosstalk, noise, scattering, and temporal analysis from Lumerical INTERCONNECT. Memory subsystems were simulated using the PCACTI tool described in detail by *Fincacti: Architectural Analysis and Modeling of Caches with Deeply-Scaled FinFET Devices*, A. Shafaei et al., 2014 IEEE Computer Society Annual Symposium on VLSI, 2014, pp. 290-295.

Table IV shows the list of optical parameters used for the photonic devices. These optical parameters are from simulated and demonstrated (referenced) devices, and are used for each of the conservative, moderate, and aggressive estimates of the photonic accelerator architectures. The memory subsystem estimates are for 7 nm FinFET technology. The global SRAM buffer has 256 kB of storage and a footprint of 0.59×0.34 $mm^2$. The photonic locally-connected group kernel caches have 16 kB of storage and a footprint of 0.092×0.085 $mm^2$.

Photonic processing requires high amounts of electrical to optical and optical to electrical conversions, which can easily become a bottleneck for the digital to analog and analog to digital converters. The digital to analog and analog to digital converters utilized support 8-bit precision and operate at 5 GS/s, which limits the modulation rate to 5 GHz for the conservative and moderate estimations. Aggressive estimates increase the sampling rate to 8 GS/s. Higher sampling rates are achievable at this precision, but at the cost of higher power consumption.

The performance of the disclosed photonic accelerator was evaluated on convolutional neural networks models including VGG16 (See *Very Deep Convolutional Networks for Large-Scale Image Recognition*, K. Simonyan et al., 2014), ResNet18 (See *Deep Residual Learning for Image Recognition*, K. He et al., 2016 IEEE Conference on Computer Vision and Pattern Recognition (CVPR), 2016, pp. 770-778.), MobileNet (See *MobileNets: Efficient Convolutional Neural Networks for Mobile Vision Applications*, A. G. Howard et al. 2017), and AlexNet (See *Imagenet classification with deep convolutional neural networks*," A. Krizhevsky et al., Proceedings of the $25^{th}$ International Conference on Neural Information Processing Systems—Volume 1, ser. NIPS' 12. Red Hook, NY, USA: Curran Associates Inc., 2012, p. 1097-1105). A per-layer analysis was performed to yield latency, energy, and energy delay product for an inference on these convolutional neural network models. The image input to each of these convolutional neural networks models was assumed to have dimensions 224×244×3.

TABLE IV

OPTICAL DEVICE PARAMETERS

| Device | Parameter | Value |
|---|---|---|
| Waveguide | w × h | 500 × 220 nm |
| | $n_{eff}$, $n_g$ | (2.33, 4.68) @ λ = 1550 nm |
| | loss | 1.5 dB/cm (straight) 3.8 dB/cm (bent) |
| Y-branch | loss | 0.3 dB |
| | area | 1.2 × 2.2 $\mu m^2$ |
| Microring Resonator | radius | 5 μm |
| | loss | 0.39 dB |
| | $k^2$ | 0.03 |
| | FSR | 16.1 nm |
| | area | 20 × 20 $\mu m^2$ |
| Mach-Zehnder Modulator | loss | 1.2 dB |
| | area | 300 × 50 $\mu m^2$ |
| Star Coupler | loss | 1.3 dB |
| | area | 750 × 350 $\mu m^2$ |
| Arrayed Waveguide Grating | channels | 64 |
| | loss | 2.0 dB |
| | crosstalk | −34 dB |
| | FSR | 70 nm |
| | area | 5 × 2 $mm^2$ |
| Laser | RIN | −140 dBc/Hz |
| | area | 400 × 300 $\mu m^2$ |
| PIN Diode | responsivity | 1.1 A/W |
| | dark current | 25 pA @ 1 V |
| | area | 40 × 40 $\mu m^2$ |

Embodiments of the present invention were compared with two recent photonic neural net-work accelerators PIXEL (See *Pixel: Photonic Neural Network Accelerator*, K. Shiflett et al., 2020 IEEE International Symposium on High Performance Computer Architecture (HPCA), 2020, pp. 474-487) and DEAP-CNN (See *Digital Electronics and Analog Photonics for Convolutional Neural Networks (DEAP-CNNS)*, V. Bangari et al., IEEE Journal of Selected Topics in Quantum Electronics, vol. 26, no. 1, pp. 1-13, 2020). PIXEL is a mixed-signal photonic accelerator built using microring resonators for bitwise logical operations and Mach-Zehnder modulators for analog accumulation. DEAP-CNN utilizes microring resonator weight banks for dot products, and uses voltage addition for accumulation of partial sums across filter channels.

Simulations were used to apply the conservative device parameters to PIXEL and DEAP-CNN, and scale their architectures to meet a 60 W power consumption threshold. A fair comparison between these architectures was obtained by using the same device assumptions and holding the designs to the same power constraints. The 9-photonic locally-connected group neural network design, which consumes only 22.7 W of power, was compared with a 60 W version of same design, which is scaled up to 27-photonic locally-connected groups. Both DEAP-CNN and the present invention operate at 5 GHz, while PIXEL operates at 10

GHz. DEAP-CNN was unable to support 3×3 shaped kernels with more than 113 channels, and has no infrastructure in place to handle partial sums of kernels larger than this. For comparisons with embodiments of the present invention, an assumption in favor of DEAP-CNN was made that DEAP-CNN can support these larger kernels, which appear in the convolutional neural networks benchmarks used for evaluation. The PIXEL architecture to which embodiments of the present invention was compared was an 8-bit "OO" optical multiply-and-accumulate unit. The number of PIXEL 8-bit optical multiply-and-accumulate units was scaled to meet the 60 W power constraint.

Embodiments of the present invention were compared against three energy-efficient state-of-the-art electronic accelerators: Eyeriss (See *Eyeriss: A Spatial Architecture for Energy Efficient Dataflow for Convolutional Neural Networks*, Y. Chen et al., 2016 ACM/IEEE 43rd Annual International Symposium on Computer Architecture (ISCA), 2016, pp. 367-379 and *Eyeriss: An Energy-Efficient Reconfigurable Accelerator for Deep Convolutional Neural Networks*, Y. Chen et al., IEEE Journal of Solid-State Circuits, vol. 52, no. 1, pp. 127-138, 2017.), ENVISION (14.5 *ENVISION: A 0.26-to-10tops/w Subword-Parallel Dynamic-Voltage-Accuracy-Frequency-Scalable Convolutional Neural Network Processor in 28 nm FDSOI*, B. Moonset al., 2017 IEEE International Solid-State Circuits Conference (ISSCC), 2017, pp. 246-247.), and UNPU (*Unpu: An Energy-Efficient Deep Neural Network Accelerator with Fully Variable Weight Bit Precision*, J. Lee et al., IEEE Journal of Solid-State Circuits, vol. 54, no. 1, pp. 173-185, 2019). Each of the above accelerators represents a different energy-efficient computation technique. Eyeriss is a spatial architecture that takes advantage of row-stationary dataflow to reduce energy consumption. ENVISION uses subword parallel multiply-and-accumulates with dynamic voltage, frequency, and bit precision scaling. UNPU is lookup table-based bit-serial processor with variable bit precision. The latency and energy efficiency of these architectures listed herein are from the performance reported by their respective publications.

Figure 15:
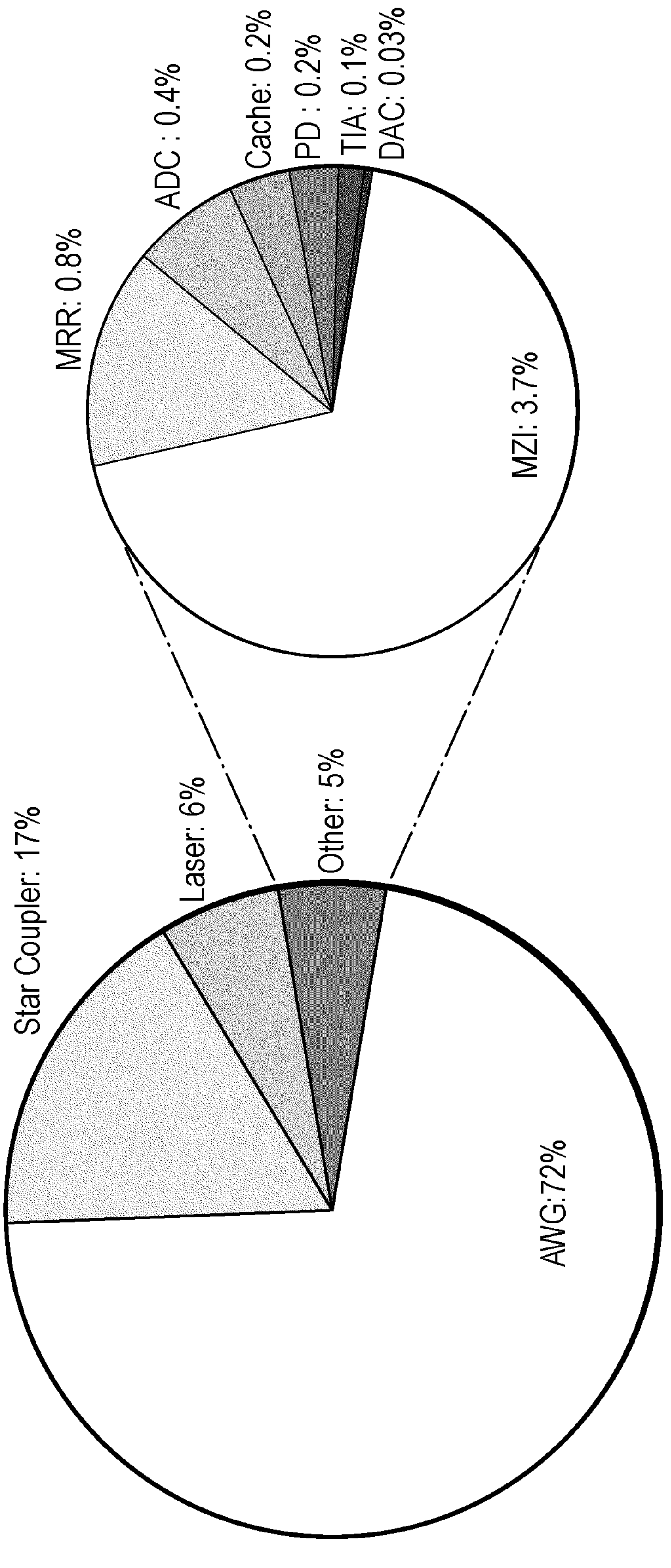
FIG. 15 is a graphical view illustrating a chip area breakdown for the neural network accelerator of FIG. 13.

The photonic accelerator model occupies an estimated 124.6 mm$^2$, most of which is for optical signal distribution components, such as the demultiplexers 132 (72%) and optical couplers 134 (17%). Although a single demultiplexer 132 uses 8% of the total area, it is a passive diffractive device and does not consume energy. The optical modulators 10 are the largest computation device, occupying 3.7% of the total area. Mach-Zehnder optical modulators are competitive for fast multiplication despite their large footprint, and achieve 333 GOPS/mm$^2$ when multiplying just a single optical input at 5 GHz modulation. For comparison, a recent approximate 8-bit multiplier achieves just 7.3 GOPS/mm$^2$ (See *Approximate Multipliers Based on New Approximate Compressors*, D. Esposito et al., IEEE Transactions on Circuits and Systems I: Regular Papers, vol. 65, no. 12, pp. 4169-4182, 2018), which is 46 times lower than the optical modulators 10. This performance gap is further widened when the optical modulators 10 multiply several input wavelengths at once in a wavelength-division multiplexing system. FIG. 15 depicts pie charts illustrating the area breakdown for all components in the phonic accelerator. Photonic devices may have relatively large footprints as compared to digital electronics, so hybrid photonic-electronic circuits may occupy a majority of the total area of the photonic accelerator.

Figure 16:
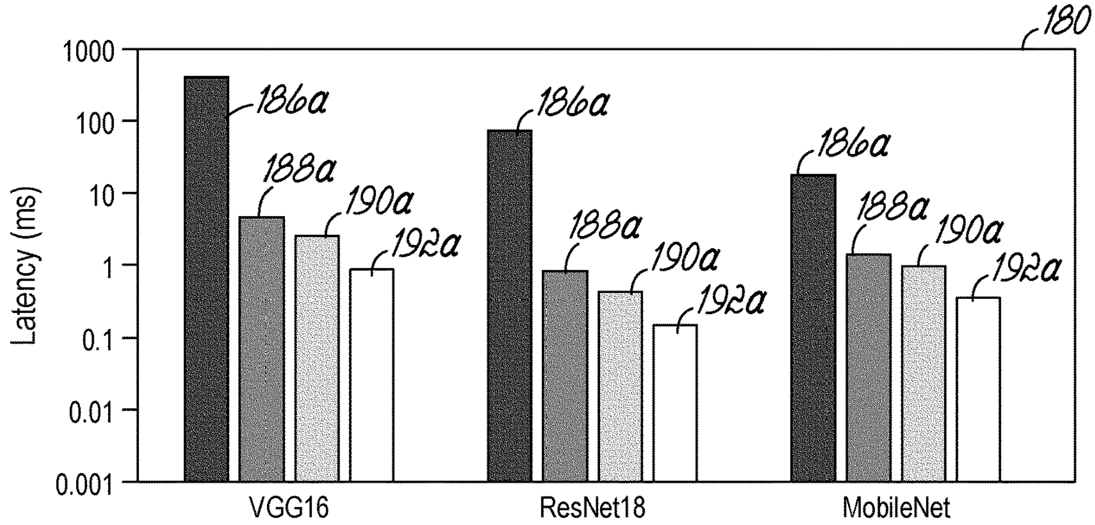
FIGS. 16-18 are graphical views illustrating benchmark comparisons between neural network accelerators of FIG. 13 using different device parameters.
Figure 17:
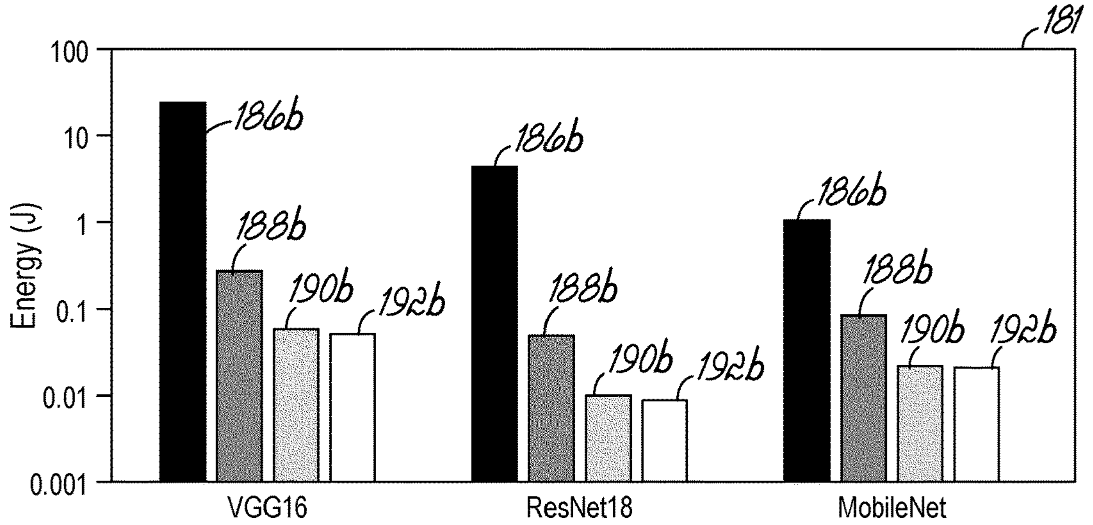
Figure 18:
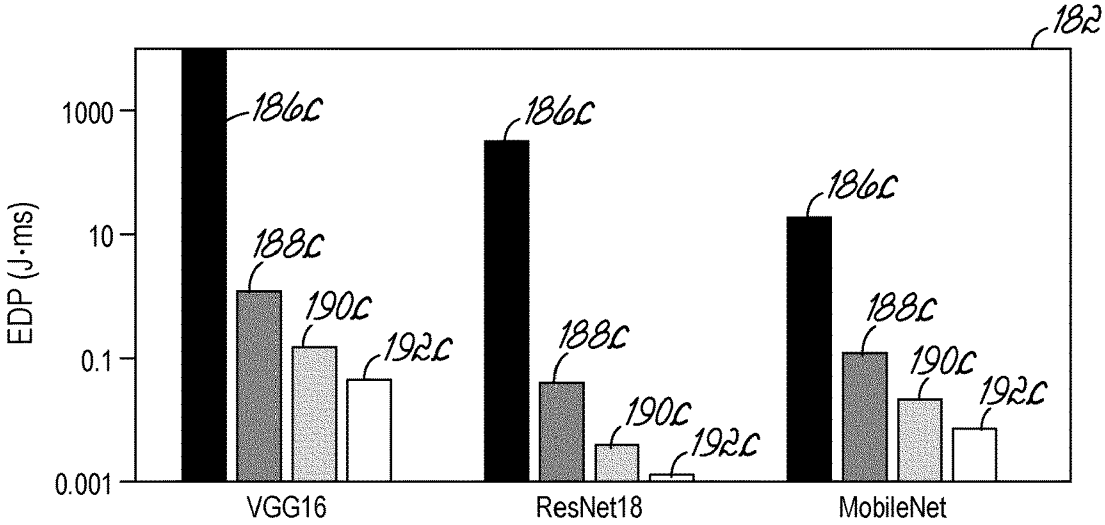

FIGS. 16-18 depict graphs 180-182 comparing the simulated performance between PIXEL and DEAP-CNN and photonic accelerators having 9- and 27-photonic locally-connected groups 130. Bars 186*a*-186*c* depict data for the PIXEL accelerator, bars 188*a*-188*c* depict data for the DEAP-CNN accelerator, bars 190*a*-190*c* depict data for an embodiment of the photonic accelerator with 9-photonic locally-connected groups 130, and bars 192*a*-192*c* depict data for an embodiment of the photonic accelerator 160 with 27-photonic locally-connected groups 130. Data was collected using each of the VGG16, ResNet18, and MobileNet models.

As can be seen, embodiments of the present invention outperform known photonic accelerators in all simulated metrics. On average, the photonic accelerator having 9-photonic locally-connected groups 130 (22.7 W) improves latency by 79.5 times and 1.7 times when compared to PIXEL and DEAP-CNN, respectively. Latency is further improved when scaling to the same power constraints with the photonic accelerator including 27-photonic locally-connected groups (58.8 W), giving average reductions of 225 times and 4.8 times when compared to PIXEL and DEAP-CNN, respectively. The 58.8 watt design reduces average energy consumption by 226 times and 4.9 times as compared to PIXEL and DEAP-CNN, respectively, and reduces energy delay product by 50,957 times and 23.9 times as compared to PIXEL and DEAP-CNN, respectively. A comparison using a combination metric that indicates how efficiently the architectures utilize wavelength-division multiplexing for computation in units of energy per wavelength indicates embodiments of the present invention have a 30.9 times better wavelength-division multiplexing efficiency than DEAP-CNN on average, and 1680 times better wavelength-division multiplexing efficiency compared to PIXEL.

The performance of embodiments of the present invention compared with state-of-the-art digital accelerators is shown in Tables V and VI. When averaged across all three accelerators, the conservative estimate improves latency by 110 times and energy delay product by 74.2 times. The moderate estimate consumes roughly equal energy to both ENVISION and UNPU, and reduces energy delay product by an average of 275 times. Eyeriss is an outlier for energy delay product, so the moderate and aggressive estimates are compared directly with ENVISION and UNPU for this metric. The moderate estimate reduces energy delay product by 23.1 times and 216 times as compared to UNPU and ENVISION, respectively. The aggressive estimate further improves performance by giving an average of 177 times lower latency, and improving energy delay product by 229 times and 2137 times as compared to UNPU and ENVISION, respectively.

TABLE V

COMPARISON BETWEEN MODELED CIRCUITS USING ALEXNET

| | Eyeruss | Envision | UNPU | Con. | Mod. | Aggr. |
|---|---|---|---|---|---|---|
| Latency (ms) | 25.9 | 21.3 | 2.89 | 0.13 | 0.13 | 0.080 |
| Energy (mJ) | 7.19 | 0.94 | 0.84 | 2.90 | 0.80 | 0.13 |
| EDP (mJ · ms) | 186.1 | 20.0 | 2.42 | 0.37 | 0.10 | 0.010 |

TABLE VI

COMPARISON BETWEEN MODELED CIRCUITS USING VGG16

| | Eyeruss | Envision | UNPU | Con. | Mod. | Aggr. |
|---|---|---|---|---|---|---|
| Latency (ms) | 1252 | 598.8 | 54.6 | 2.55 | 2.55 | 1.60 |
| Energy (mJ) | 295.4 | 15.6 | 16.2 | 58.1 | 15.7 | 2.56 |
| EDP (mJ · ms) | 370,000 | 9341 | 886.9 | 148.2 | 40.1 | 4.09 |

Figure 19:
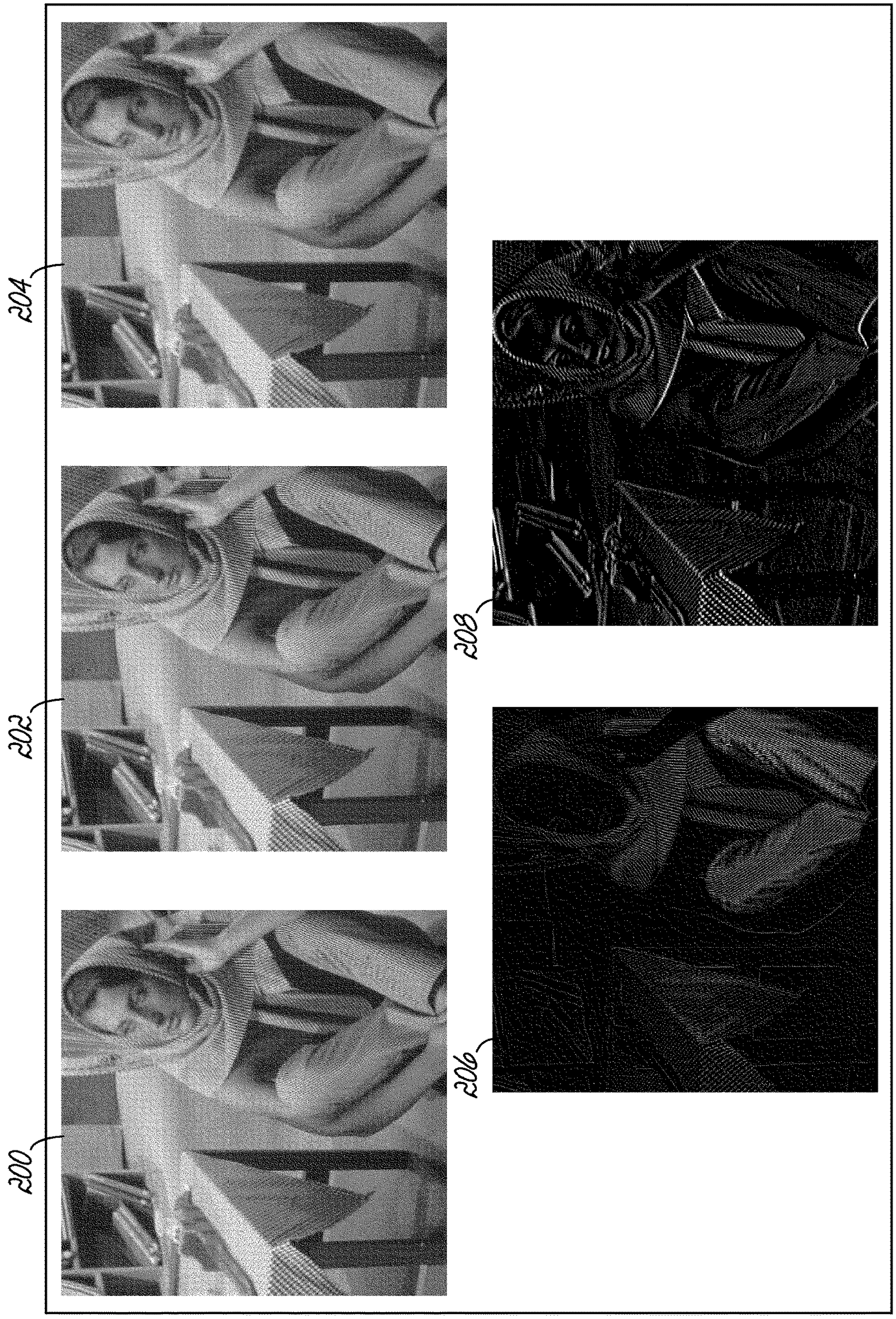
FIG. 19 is a plane view of images illustrating the results of convolutions using the photonic locally-connected units of FIG. 9A to apply an identity kernel, a Gaussian blur kernel, an edge detect kernel, and a horizontal Prewitt kernel to a test image.
Figure 20:
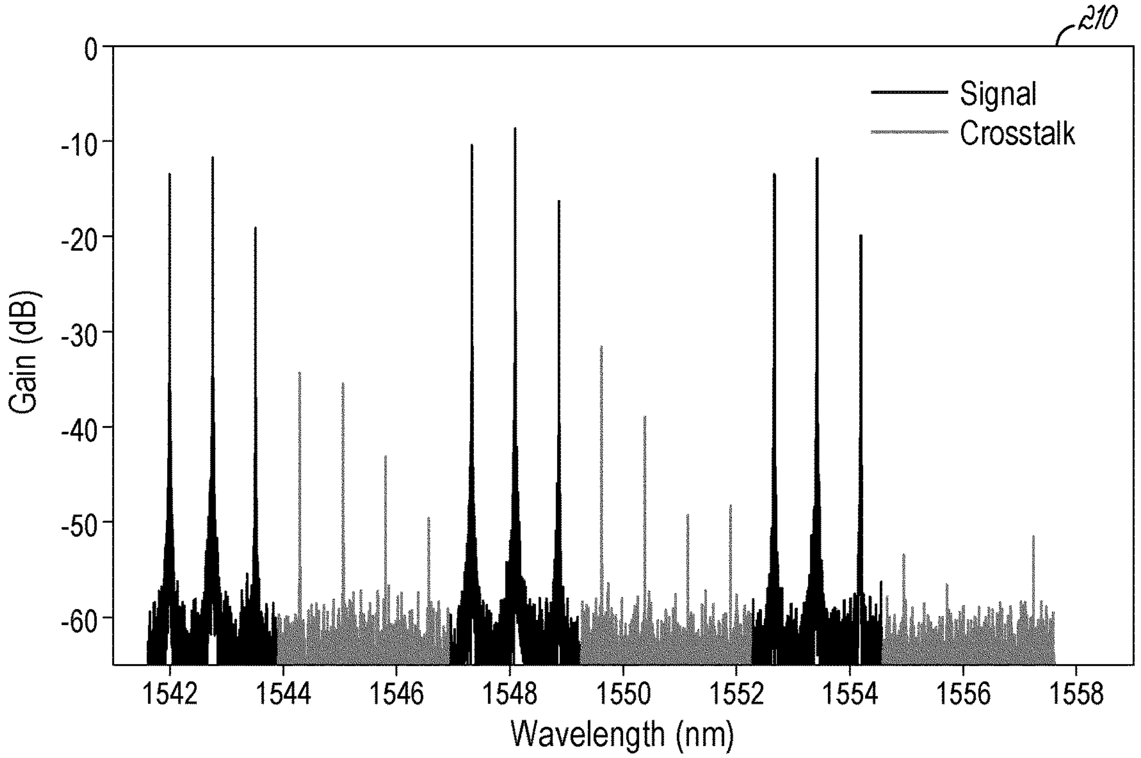
FIGS. 20 and 21 are graphical views illustrating exemplary optical dot product signals generated using the Gaussian blur kernel.
Figure 21:
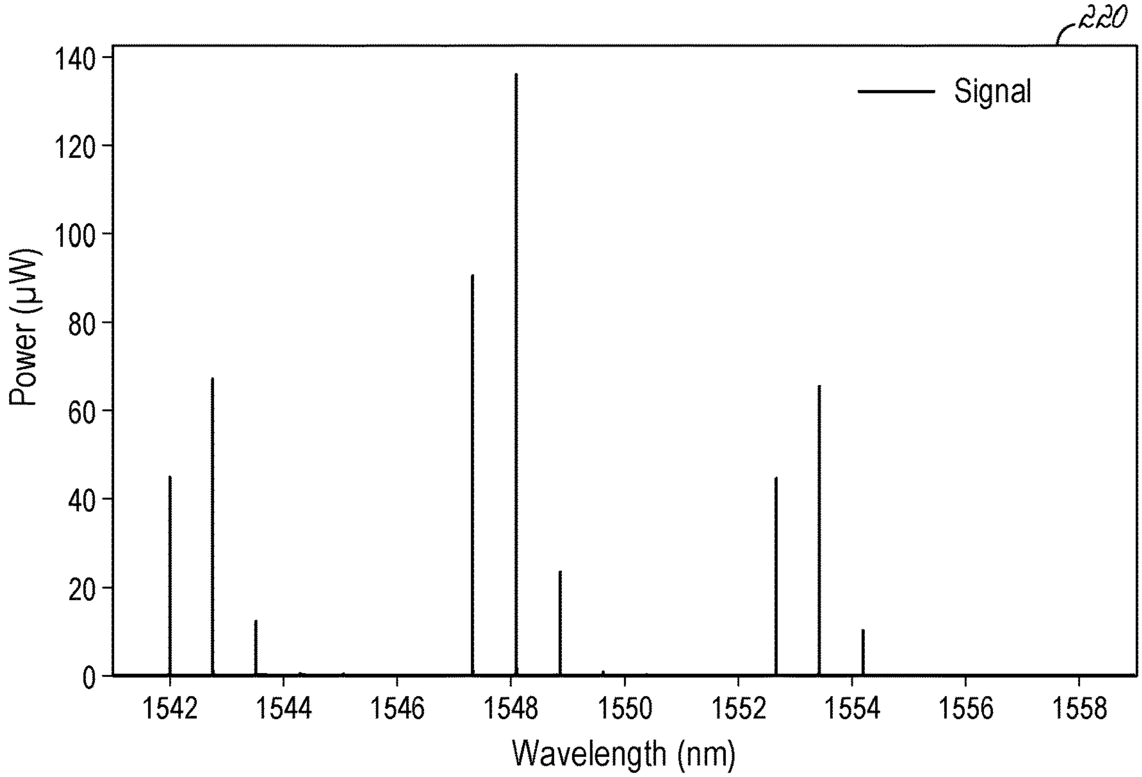

Convolution was evaluated on a ($N_m$=9, $N_d$=5) photonic locally-connected unit with various 3×3 image processing kernels, and the results compared with an 8-bit precision convolution. FIG. 19 depicts a test image 200, and images 202, 204, 206, and 208 that illustrate convolution results for the identity kernel, Gaussian blur kernel, edge detect kernel, and horizontal Prewitt kernel, respectively. The results from the photonic locally-connected unit were compared to a full precision convolution using peak signal-to-noise ratio, which is an indication of the error between the two results. Embodiments of the invention achieved a peak signal-to-noise ratio of 50.8 dB for the identity kernel, 53.3 dB for the Gaussian blur kernel, 41.5 dB for the edge detect kernel, and 42.1 dB for the horizontal Prewitt kernel. All results have peak signal-to-noise ratios greater than 40 dB, which is comparable to the error of lossy image compression. This means that photonic locally-connected unit dot products can yield results close to 8-bit precision, even with noise and crosstalk. FIGS. 20 and 21 depict graphs 210, 220 showing exemplary optical dot product signals using the Gaussian blur kernel. These are the accumulated optical signals incident on the photo diodes for a single receptive field. The "SIGNAL" plots represent the dot product signals, while the "CROSSTALK" plot represents the crosstalk from the adjacent receptive fields that are concurrently computed in the photonic locally-connected unit. FIG. 20 shows the optical power gain in dB, and FIG. 21 shows the optical power in μW.

Embodiments of the invention include photonic neural network accelerators that exploit multicast data patterns found in deep neural networks. The photonic neural network accelerators increase parallel computation through novel dot product processing in photonic locally-connected units, and leverage broadcasts to concurrently compute on multiple kernels. The disclosed photonic accelerators reduce energy delay product by at least 24 times on convolutional neural networks benchmarks when compared to known photonic accelerators. With conservative estimates, embodiments of the invention may improve latency by 110 times and energy delay product by 74 times on average when compared to state-of-the-art electronic accelerators. With aggressive estimates, latency improves to 177 times on average and energy delay product by at least 229 times as compared to state-of-the-art electronic accelerators.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A neural network accelerator, comprising:

a photonic locally-connected unit including:

a plurality of weighted input waveguides;

a plurality of optical modulators each receiving a respective composite input optical signal including plurality of input optical signals each having a unique wavelength within the respective composite input optical signal and indicative of a value of a respective input element of a plurality of input elements, receiving a respective electrical signal indicative of the value of a respective weight, and modulating the respective composite input optical signal with the respective electrical signal to generate a respective plurality of weighted optical signals that are operatively coupled to a respective one of the plurality of weighted input waveguides;

a plurality of positive accumulation waveguides;

a plurality of negative accumulation waveguides;

a plurality of optical adders each selectively coupling one of the respective weighted optical signals from a respective weighted input waveguide into one of a respective positive accumulation waveguide or a respective negative accumulation waveguide based on whether the respective weight is positive or negative;

a plurality of first photodetectors each operatively coupled to a respective positive accumulation waveguide and that generates a positive current in response to receiving a first accumulated optical signal from the respective positive accumulation waveguide; and a plurality of second photodetectors each operatively coupled to a respective negative accumulation waveguide and that generates a negative current in response to receiving a second accumulated optical signal from the respective negative accumulation waveguide, wherein the photonic locally-connected unit generates a plurality of output currents each a sum of a respective positive current and a respective negative current.

2. The neural network accelerator of claim 1, wherein each optical adder includes a microring resonator.

3. The neural network accelerator of claim 1, wherein each optical modulator includes a Mach-Zehnder modulator.

4. The neural network accelerator of claim 1, wherein the photonic locally-connected unit is one of a plurality of photonic locally-connected units in a photonic locally-connected group, and further comprising:

an optical demultiplexer that receives a plurality of composite input optical signals and separately couples each input optical signal into one of a first plurality of optical waveguides that is partitioned into a plurality of waveguide groups each including a portion of the first plurality of optical waveguides;

a plurality of optical couplers each configured to receive a respective portion of the first plurality of optical waveguides, and output a multicast pattern of the input optical signals carried by the respective portion of the first plurality of optical waveguides into a second plurality of optical waveguides such that each optical waveguide of the second plurality of optical waveguides carries a first plurality of input optical signals.

5. The neural network accelerator of claim 4, wherein the photonic locally-connected group is one of a plurality of photonic locally-connected groups, and further comprising:

an optical signal generator that generates the plurality of composite input optical signals; and a plurality of Y-branches that broadcast the plurality of composite input optical signals to each of the plurality of photonic locally connected groups.

6. The neural network accelerator of claim 5, wherein each photonic locally-connected group operates on a single kernel, and a plurality of kernels is applied in a convolutional neural network layer.

7. A method of accelerating a neural network, comprising:

receiving a plurality of composite input optical signals each including a plurality of input optical signals each having a unique wavelength within its respective composite signal and indicative of a value of a respective input element of a plurality of input elements, receiving plurality of electrical signals each indicative of the value of a respective weight at a respective one of a plurality of optical modulators;

modulating each composite input optical signal with a respective one of the plurality of electrical signals to generate a respective plurality of weighted optical signals;

coupling each respective plurality of weighted optical signals into a respective one of a plurality of weighted input waveguides;

for each of the plurality of weighted input waveguides:

for each of the plurality of weighted optical signals coupled into the weighted input waveguide, selectively coupling the weighted optical signal from the weighted input waveguide into a respective one of a plurality of positive accumulation waveguides or a respective one of a plurality of negative accumulation waveguides based on whether the respective weight is positive or negative;

for each positive accumulation waveguide of the plurality of positive accumulation waveguides, generating a positive current based on a first accumulated optical signal from the positive accumulation waveguide;

for each negative accumulation waveguide of the plurality of negative accumulation waveguides, generating a negative current based on a second accumulated optical signal from the negative accumulation waveguide; and for each of a plurality of pairs of accumulator waveguides each including a respective positive accumulation waveguide and a respective negative accumulation waveguide, generating an output current by summing the positive current generated based on the first accumulated optical signal and the negative current generated based on the second accumulated optical signal.

8. The method of claim 7, wherein each weighted optical signal is selectively coupled to the one of the plurality of positive accumulation waveguides or the plurality of negative accumulation waveguides by a microring resonator.

9. The method of claim 7, wherein each optical modulator includes a Mach-Zehnder modulator.

10. The method of claim 9, further comprising:

separately coupling each input optical signal into one of a first plurality of optical waveguides that is partitioned into a plurality of waveguide groups each including a portion of the first plurality of optical waveguides;

receiving a respective portion of the first plurality of optical waveguides at each of a plurality of optical couplers; and outputting a multicast pattern of the input optical signals carried by the respective portion of the first plurality of optical waveguides into a second plurality of optical waveguides such that each optical waveguide of the second plurality of optical waveguides carries the first plurality of input optical signals.

11. The method of claim 10, further comprising:

generating the plurality of composite input optical signals by an optical signal generator; and broadcasting the plurality of composite input optical signals to each of a plurality of photonic locally connected groups.

12. The method of claim 11, further comprising:

operating each photonic locally-connected group on a single kernel; and applying a plurality of kernels in a convolutional neural network layer.

* * * * *